US012724725B2

(12) United States Patent
Sun et al.

(10) Patent No.: US 12,724,725 B2
(45) Date of Patent: Sep. 1, 2026

(54) CONCEPT FOR PROVIDING ACCESS TO REMOTE MEMORY

(71) Applicant: Intel Corporation, Santa Clara, CA (US)

(72) Inventors: Zhonghua Sun, Shanghai (CN); Changcheng Liu, Shanghai (CN); Yi Sun, Shanghai (CN); Cong Zhang, Shanghai (CN); Di Zhang, Shanghai (CN); Zhuangzhi Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 18/572,199

(22) PCT Filed: Sep. 26, 2021

(86) PCT No.: PCT/CN2021/120711
§ 371 (c)(1),
(2) Date: Dec. 20, 2023

(87) PCT Pub. No.: WO2023/044861
PCT Pub. Date: Mar. 30, 2023

(65) Prior Publication Data

US 2024/0289286 A1 Aug. 29, 2024

(51) Int. Cl.
*G06F 13/16* (2006.01)
*G06F 13/40* (2006.01)
*G06F 12/0817* (2016.01)

(52) U.S. Cl.
CPC ........ *G06F 13/1668* (2013.01); *G06F 13/404* (2013.01); *G06F 12/0828* (2013.01); *G06F 2212/621* (2013.01)

(58) Field of Classification Search
CPC ........................... G06F 13/1668; G06F 13/404
See application file for complete search history.

(56) References Cited

U.S. PATENT DOCUMENTS 5,655,100 A * 8/1997 Ebrahim ............. G06F 12/0822 711/146
11,860,781 B1 * 1/2024 Raz ....................... G06F 3/0604
2019/0018785 A1 1/2019 Beard et al.
2019/0320019 A1 * 10/2019 Hamrick, Jr. ........... H04L 67/10
2019/0347125 A1 * 11/2019 Sankaran ............ G06F 9/30036
(Continued)

FOREIGN PATENT DOCUMENTS

CN 1547126 A 11/2004
CN 105389120 A 3/2016

*Primary Examiner* — Eric T Loonan
(74) *Attorney, Agent, or Firm* — SPL Patent Attorneys PartG mbB; Yong Beom Hwang

(57) ABSTRACT

Examples relate to a concept for providing access to remote memory. A network interface controller apparatus comprises circuitry configured to obtain a memory transaction request with respect to memory of a first host hosting the network interface controller apparatus from a second host. The circuitry is configured to translate the memory transaction request to a cache transaction request. The circuitry is configured to provide the cache transaction request to the first host. The circuitry is configured to obtain a response to the cache transaction request from the first host. The circuitry is configured to provide information on the response to the cache transaction request to the second host.

19 Claims, 17 Drawing Sheets

OBTAINING A MEMORY TRANSACTION REQUEST — 210
EXTRACTING THE MEMORY TRANSACTION REQUEST — 220
TRANSLATING THE MEMORY TRANSACTION REQUEST — 230
PROVIDING A CACHE TRANSACTION REQUEST — 240
OBTAINING A RESPONSE TO THE CACHE TRANSACTION REQ. — 250
TRANSLATING THE RESPONSE — 260
ENCAPSULATING INFORMATION ON THE RESPONSE — 270
PROVIDING THE INFORMATION ON THE RESPONSE — 280

(56) References Cited

U.S. PATENT DOCUMENTS

| | | | | |
|---|---|---|---|---|
| 2020/0050551 | A1 | 2/2020 | He et al. | |
| 2020/0328879 | A1* | 10/2020 | Makaram | H04L 1/1812 |
| 2020/0371914 | A1* | 11/2020 | Wang | G06F 12/0246 |
| 2021/0374056 | A1* | 12/2021 | Malladi | G06F 13/4234 |

* cited by examiner

| field | type | value | Description |
|---|---|---|---|
| IP | Int | e.g. 0x7F000001 | IP address: 127.0.0.1==7F.00.00.01, one MmCfg register. Indicating remote host which provides physical memory mapped to native memory. |
| Remote Address | Long int | e.g. 0xfe**a000 | One MmCfg register, indicating Remote Address; this address mapping to Local Memory block. |
| Local Address | Long int | e.g. Address: 0xfe**b000 | system address of memory range about Memory block; local host access the memory block and mapped remote host's IP/ADDR which provided by remote host. |
| Memory Size | Long int | Range size of memory: e.g. 64K | Size of one memory block in local address system, the memory size same with remote memory size. |

FIG. 5

| CXL.mem: MemOpcode | CXL.mem's SnpType value, or No-opt for snoop | Translates to D2H(device to host)CXL.cache In Snoop Agent | Description |
|---|---|---|---|
| MedRd | SnpCur | RdCurr | CXL.mem-MemRd to CXL.cache RdCurr |
| | SnpData | RdCurr | CXL.mem-MemRd to CXL.cache RdCurr |
| | SnpInv | RdCurr | CXL.mem-MemRd to CXL.cache RdCurr |
| MemRdDATA | SnpCur | RdCurr | CXL.mem-MemRd Data to CXL.cache RdCurr |
| | SnpData | RdCurr | CXL.mem-MemRd Data to CXL.cache RdCurr |
| | SnpInv | RdCurr | CXL.mem-MemRd Data to CXL.cache RdCurr |
| MemInv | SnpInv | No need Translation and forwarding | Memory Router returns Cmp (Complete) to Host directly |
| MemWr | SnpCur | MemWr | CXL.mem-MemWr to CXL.cache MemWr |
| | SnpData | MemWr | CXL.mem-MemWr to CXL.cache MemWr |
| | SnpInv | MemWr | CXL.mem-MemWr to CXL.cache MemWr |
| MemWrP | SnpCur | MemWr | CXL.mem-MemWr to CXL.cache MemWr |
| | SnpData | MemWr | CXL.mem-MemWr to CXL.cache MemWr |
| | SnpInv | MemWr | CXL.mem-MemWr to CXL.cache MemWr |

FIG. 7

| ACPI table | Value | Description |
|---|---|---|
| HMAT.Creator ID | "RCM memory" | Expand new value to indicate RCM device for OS. |
| MAT.Flags | 1 | Enable flags for hot plugging. |
| MAT.Flags.Hot | 1 | Enable hot plugging for RCM memory to upper OS. |

FIG. 8

OBTAINING INFORMATION ON A NETWORK INTERFACE CONTROLLER

1012

INCLDUING THE NETWORK INTERFACE CONTROLLER AS HOT-PLUGGABLE MEMORY

1014

CONCEPT FOR PROVIDING ACCESS TO REMOTE MEMORY

TECHNICAL FIELD

Examples relate to a concept for providing access to remote memory, in particular, but not exclusively, to network interface controller apparatuses, devices, methods and computer programs suitable for providing remote access to memory of a host, and to apparatuses, devices, methods and computer programs for initializing a network interface controller apparatus or device.

BACKGROUND

Data sharing and migration among distributed hosts is a vital task in cloud/edge computing usage scenarios, such as the sharing and distribution of virtual machine data or artificial intelligence data. The consistency and efficiency of sharing data among hosts is a key performance metric in such scenarios.

SHORT DESCRIPTION OF THE FIGURES

Some examples of apparatuses and/or methods will be described in the following by way of example only, and with reference to the accompanying figures, in which FIG. 1 shows a schematic diagram of an example of memory access via remote direct memory access;

FIG. 2*a* shows a block diagram of an example of network interface controller apparatus or device;

FIG. 2*b* shows a block diagram of an example of hosts comprising network interface controller apparatuses or devices;

FIG. 2*c* shows a flow chart of an example of a method for a network interface controller;

FIG. 3*a* shows a block diagram of an example of network interface controller apparatus or device;

FIG. 3*b* shows a block diagram of an example of hosts comprising network interface controller apparatuses or devices;

FIG. 3*c* shows a flow chart of an example of a method for a network interface controller;

FIG. 4*a* shows a schematic diagram of an example of a remote memory network interface controller;

FIG. 4*b* shows a schematic diagram of an example of an access to remote memory being performed via a remote memory network interface controller;

FIG. 5 shows a table of an example of fields of a memory translation table;

FIG. 7 shows a table of an example of a translation between memory transaction requests and cache transaction requests;

FIG. 8 shows a table of an example of memory affinity table and heterogeneous memory attribute table entries;

Figure 9A:
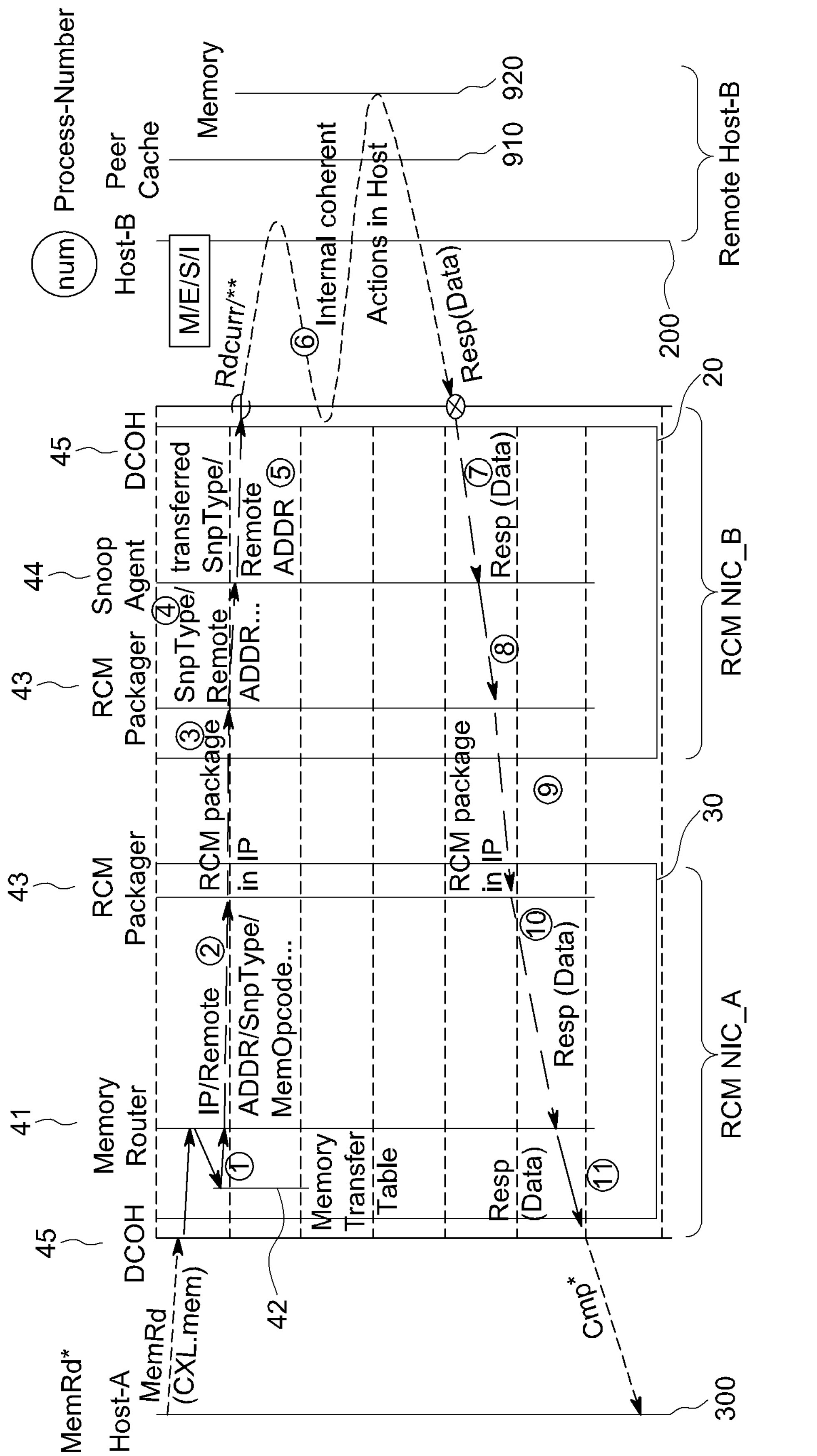
Figure 9B:
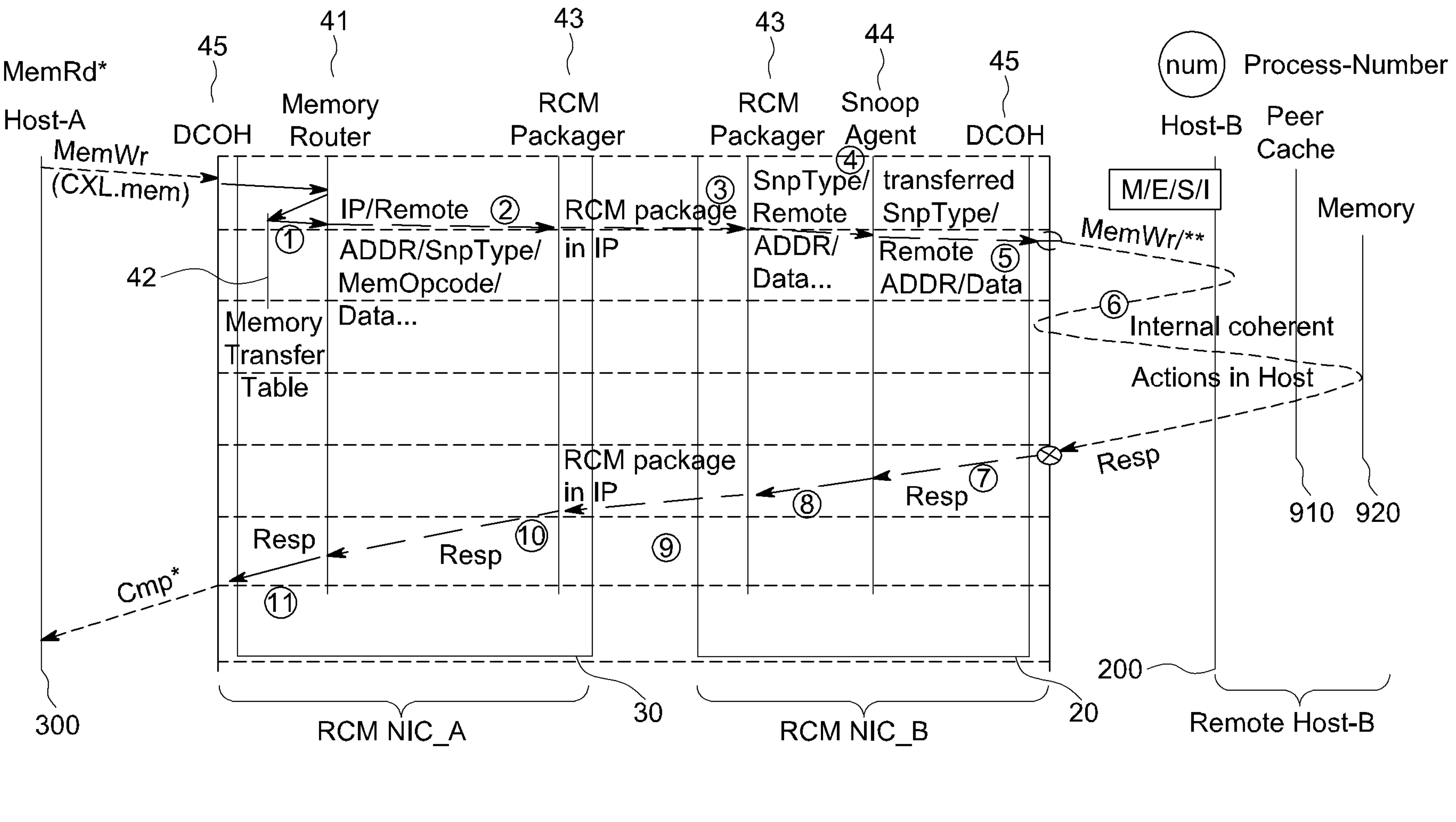
Figures 10A, 10B:
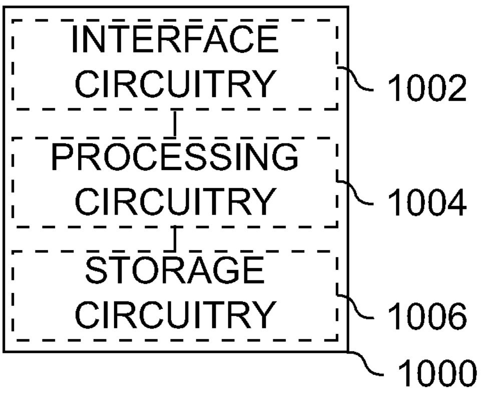
Figure 10C:
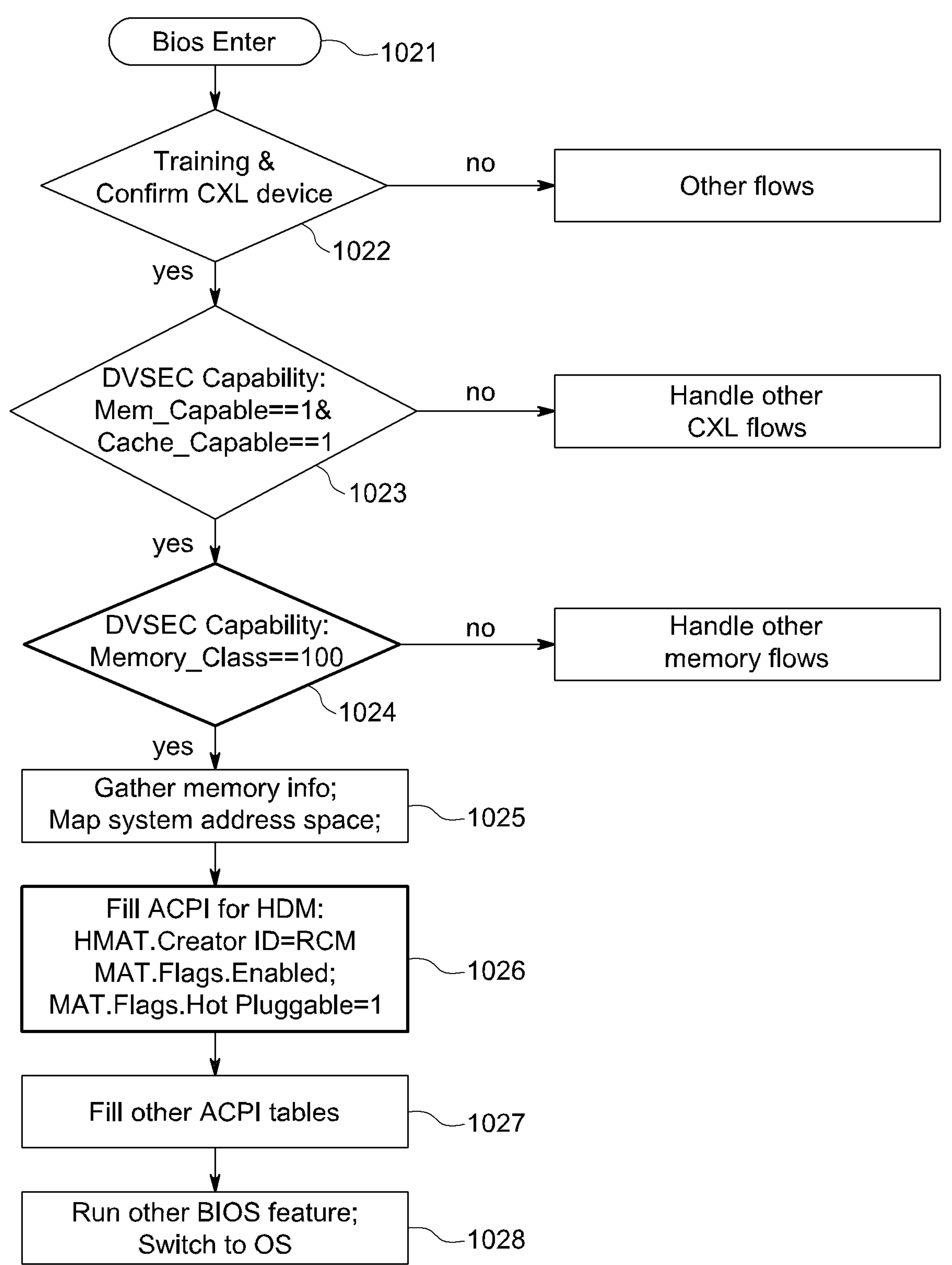
Figure 11A:
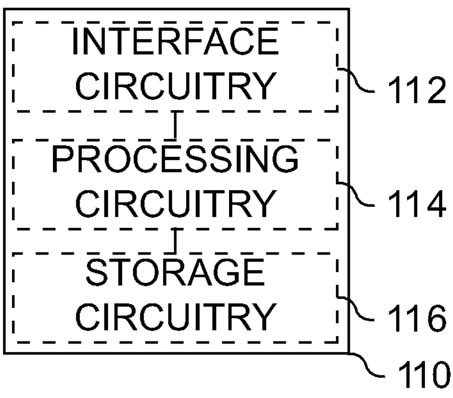
Figure 11B:
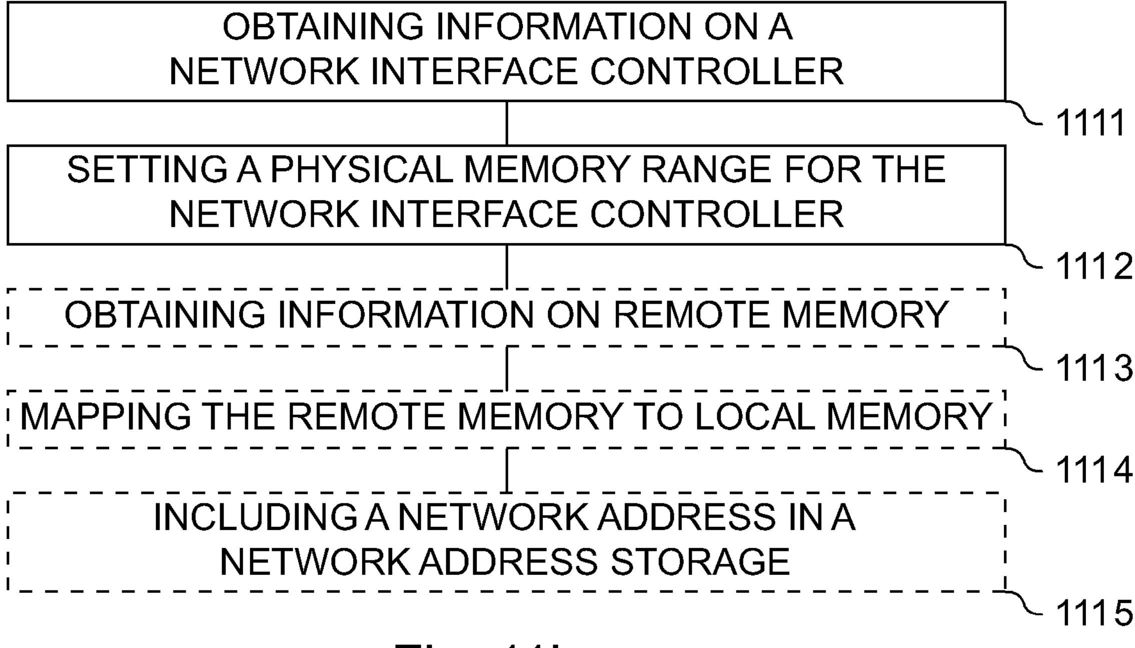
Figure 11C:
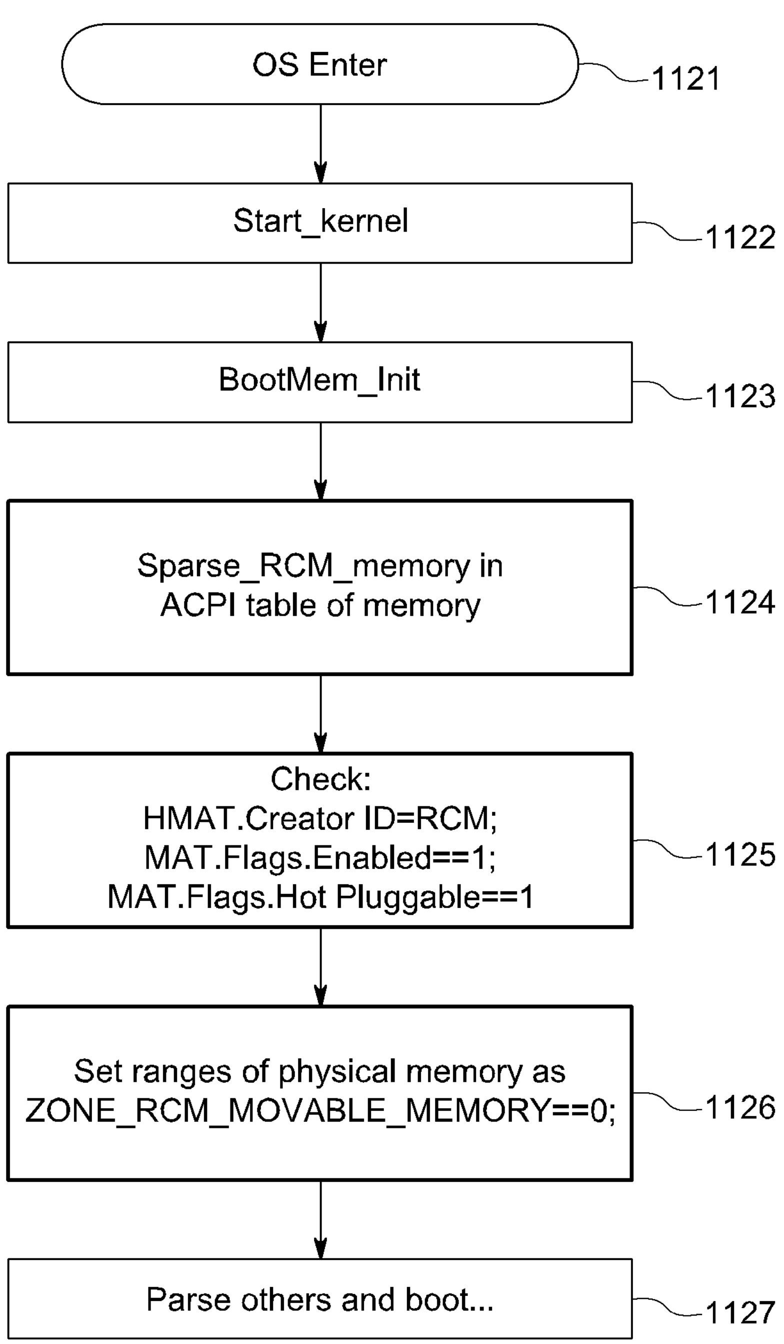
Figure 11D:
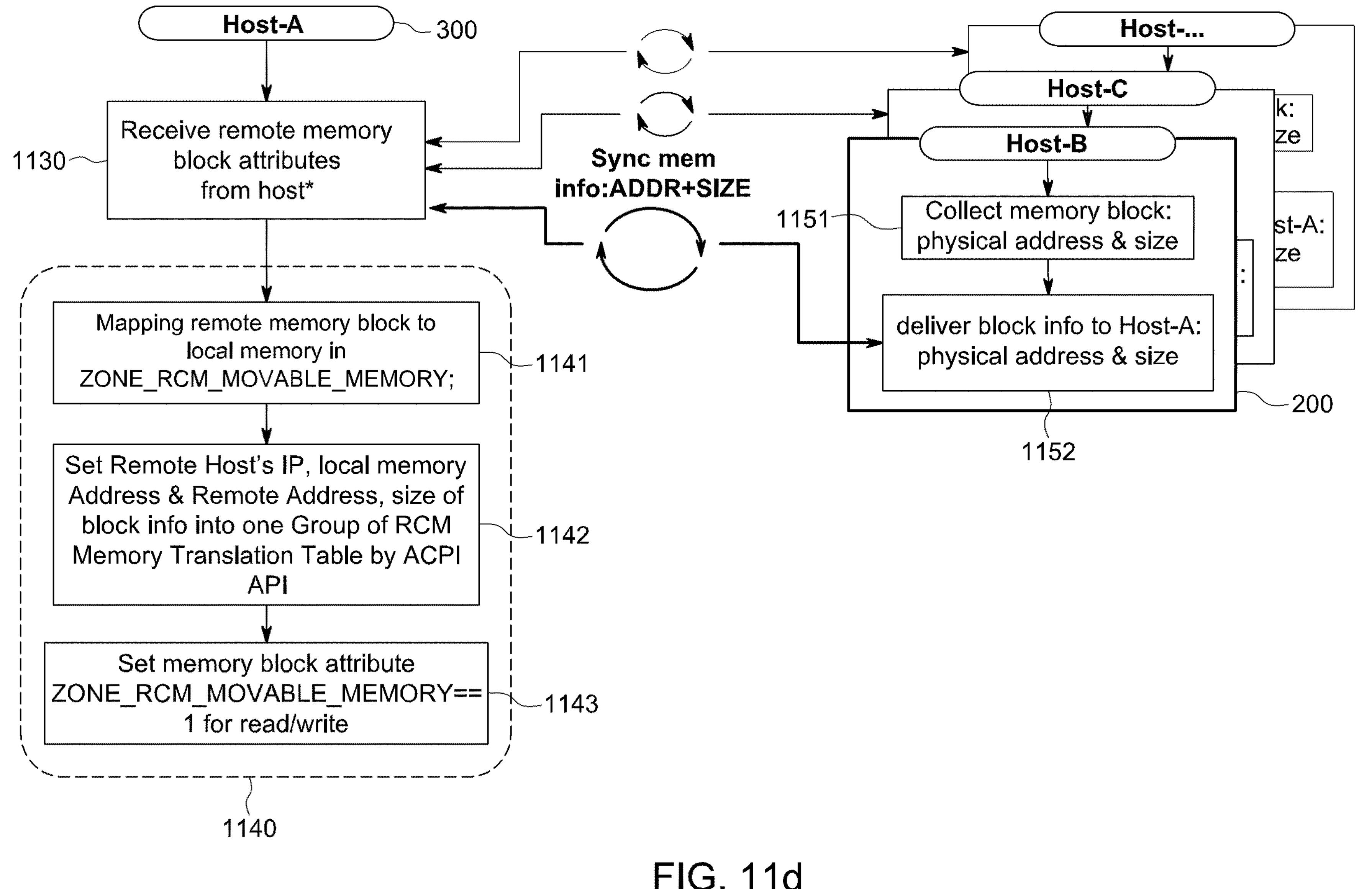

FIG. 9*a* shows a schematic diagram of an example of a data flow of a memory read operation;

FIG. 9*b* shows a schematic diagram of an example of a data flow of a memory write operation;

FIG. 10*a* shows a block diagram of an example of an apparatus or device for initializing a network interface controller apparatus or device in a host;

FIG. 10*b* shows a flow chart of an example of a method for initializing a network interface controller device in a host;

FIG. 10*c* shows a flow of an example of an initialization of remote memory on a host;

FIG. 11*a* shows a block diagram of an example of an apparatus or device for initializing a network interface controller apparatus or device in an operating system;

FIG. 11*b* shows a flow chart of an example of a method for initializing a network interface controller apparatus or device in an operating system;

FIG. 11*c* shows a schematic diagram of an example of an initialization of remote memory in an operating system of a host; and FIG. 11*d* shows a schematic diagram of an example of mapping memory among hosts.

DETAILED DESCRIPTION

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Some embodiments may have some, all, or none of the features described for other embodiments. "First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact. As used herein, the terms "operating", "executing", or "running" as they pertain to software or firmware in relation to a system, device, platform, or resource are used interchangeably and can refer to software or firmware stored in one or more computer-readable storage media accessible by the system, device, platform or resource, even though the instructions contained in the software or firmware are not actively being executed by the system, device, platform, or resource.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to embodiments of the present disclosure, are synonymous.

Various examples of the present disclosure relate to apparatuses, devices, methods, and computer programs for providing access to remote memory, in particular a Remote CXL (Compute eXpress Link) Memory (RCM) network interface controller (NIC) to natively access memory among hosts.

Figure 1:
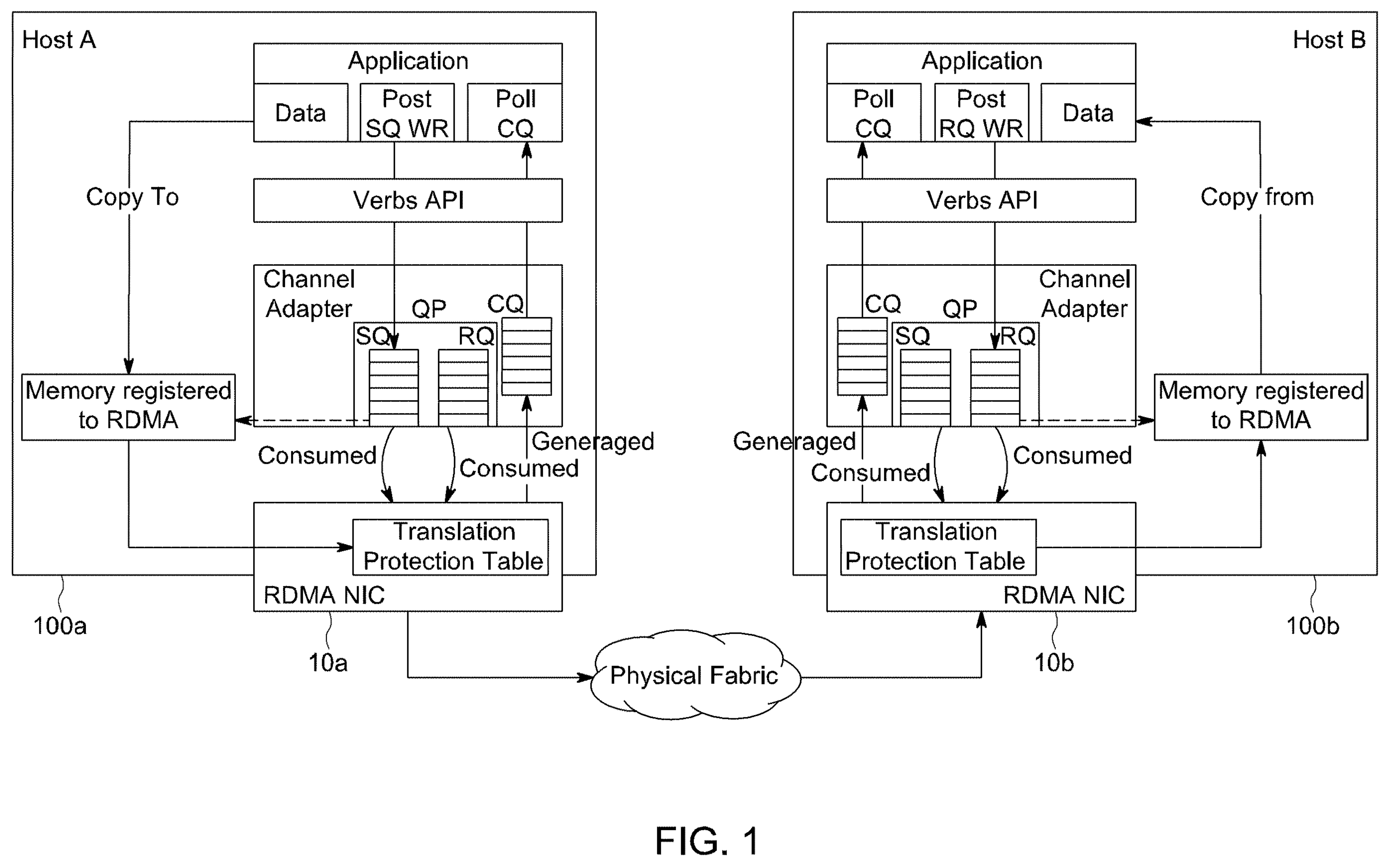

In some systems, remote direct memory access (RDMA) is used to access remote memory. FIG. 1 shows a schematic diagram of an example of memory access via remote direct memory access. RDMA has the ability of accessing (e.g. reading/writing) memory on a remote host without interrupting the processing of the CPU(s) (Central Processing Units) on that system. Hosts can move data through a PCIe I/O path.

With RDMA, Host-A 100*a* may copy data into the memory block registered into RDMA NIC 10*a*, trigger a task into a corresponding task queue and move data to peer Host-B's 100*b* NIC 10*b*. Host-B may use DMA to move into memory for further handling. This way, hosts can access each other's memory based on I/O (Input/Output). However, the memory's data that is coherent with cache cannot truly be shared. It is not truly cacheable, and non-coherent on PCIe I/O, losing performance compared with real cacheable DRAM. Moreover, RDMA does not provide native memory access. In the RDMA flow, it involves copying data, triggering various queues, and moving data by APIs (composed of various instructions) which is inefficient, complicated, and not friendly for developers. In particular, RDMA requires using complex APIs for the operation of the SQ (Send Queue)/QP (Queue Pair)/CQ (Completion Queue), which is not convenient to use. Moreover, while RDMA brings CPU off-load, it loses high performance for small blocks of data and lacks flexibility.

Technologies such as the CXL (Compute eXpress Link) technology allows external devices to be coherent for memory accessing. The proposed concept uses the coherent memory access to provide an approach for combining the techniques used in CXL with concepts known from RDMA, so that hosts can access each other's memory as if it is own memory in native way (e.g., with "mov" instructions or with local DMA's assistance). The proposed concept provides a network interface controller apparatus or device called "Remote CXL Memory" (RCM) NIC (Network Interface Card), which may be implemented as a CXL Type 2 Device. Some aspects of the proposed concept further provide a software flow to configure and use the RCM NIC. Through the use of CXL, RCM may have the same physical ports as PCIe (Peripheral Component Interconnect express).

Figure 2A:
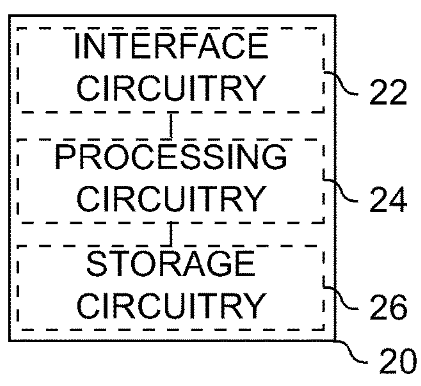

FIG. 2*a* shows a block diagram of an example of network interface controller apparatus 20 or device 20. For example, the network interface controller apparatus or device 20 may correspond to, or implement, the RCM NIC. The network interface controller apparatus 20 comprises circuitry, configured to provide the functionality of the network interface controller apparatus 20. Likewise, the corresponding network interface controller device 20 comprises processing means, configured to provide the functionality of the network interface controller device 20. The components of the network interface controller device are component means, which correspond to the corresponding structural components of the network interface controller apparatus.

For example, the circuitry of the network interface controller apparatus may comprise processing circuitry 24. The circuitry may further comprise interface circuitry 22 and/or storage circuitry 26, which are coupled with the processing circuitry 24. The means for processing of the network interface controller device may be implemented using one or more of the processing circuitry 24, the interface circuitry 22 and the storage circuitry. In general, the functionality of the respective network interface controller apparatus or device may be provided by the processing circuitry 24, with the help of the interface circuitry (for exchanging information) and storage circuitry 26 (for storing information).

Figure 3A:
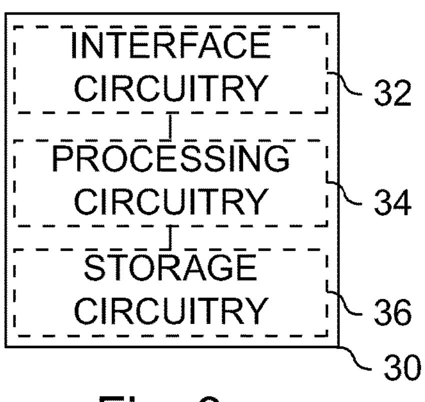

The circuitry/means for processing is configured to obtain a memory transaction request with respect to memory of a first host 200 hosting the network interface controller apparatus from a second host 300 (shown in FIG. 3). The first host 200 comprises the network interface controller apparatus or device 20. Likewise, the second host 300 comprises a corresponding network interface controller apparatus or device 30, which may correspond to the network interface controller apparatus or device introduced in connection with FIGS. 3*a* and/or 3*b*, or to the network interface controller apparatus or device of FIGS. 2*a* and/or 2*b*.

As will become evident, the network interface controller apparatus or device of FIGS. 2*a* and/or 2*b* may correspond to the network interface controller apparatus or device of FIGS. 3*a* and/or 3*b*. Alternatively, the two apparatuses/devices may differ in functionality. The circuitry/means for processing is configured to translate the memory transaction request to a cache transaction request. The circuitry/means for processing is configured to provide the cache transaction request to the first host. The circuitry/means for processing is configured to obtain a response to the cache transaction request from the first host. The circuitry/means for processing is configured to provide information on the response to the cache transaction request to the second host.

Figure 2B:
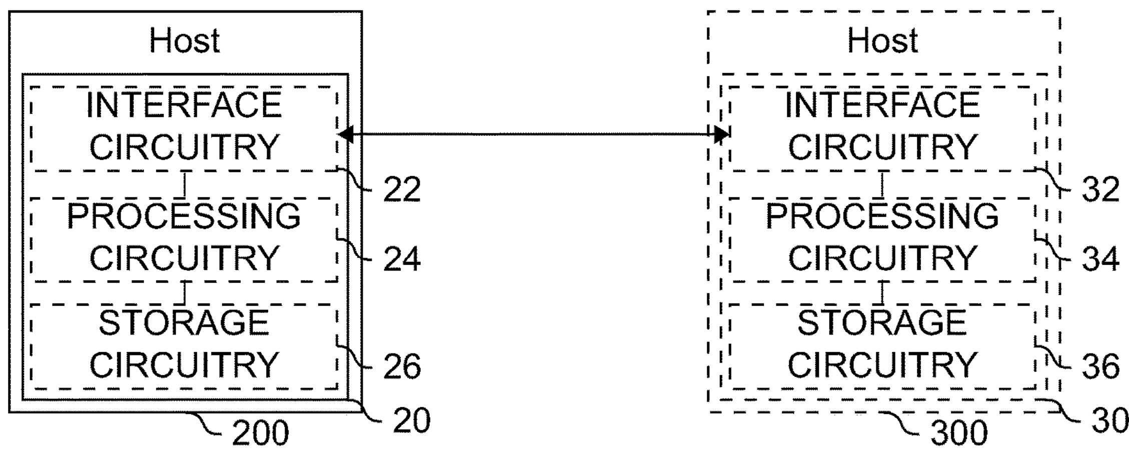

In FIG. 2*b*, the interaction between the two hosts is shown. FIG. 2*b* shows a block diagram of an example of the first host 200 and the second host 300 comprising the network interface controller apparatuses or devices 20; 30. FIG. 2*b* further shows a system comprising the network interface controller apparatus or device 20 of FIG. 2*a* and the network interface controller apparatus or device 30 of FIG. 3*a*. FIG. 2*b* further shows a system comprising the first host 200 and the second host 300.

Figure 2C:
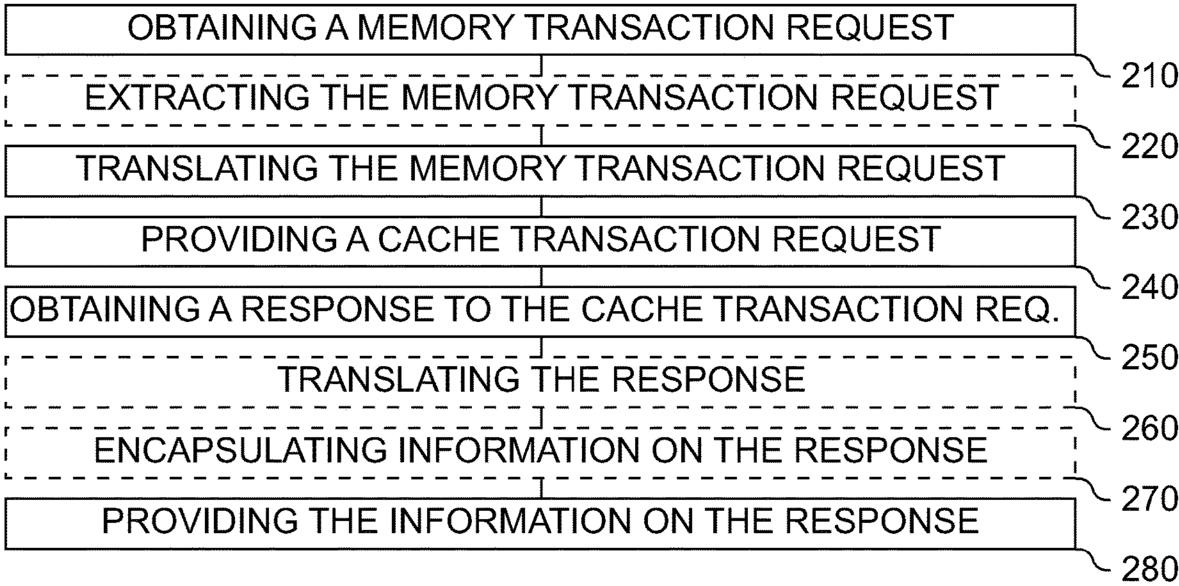

FIG. 2*c* shows a flow chart of an example of a corresponding method for a network interface controller (e.g., the network interface controller apparatus or device 20). The method comprises obtaining 210 a memory transaction request with respect to memory of a first host 200 hosting the network interface controller from a second host 300. The method comprises translating 230 the memory transaction request to a cache transaction request. The method comprises providing 240 the cache transaction request to the first host. The method comprises obtaining 250 a response to the cache transaction request from the first host. The method comprises providing 280 information on the response to the cache transaction request to the second host.

In the following, the functionality of the network interface controller apparatus, device, method, and of a corresponding computer program is introduced in connection with the network interface controller apparatus. Features introduced in connection with the network interface controller apparatus may likewise be introduced into the corresponding network interface controller device, method, and computer program In the present disclosure, a first host 200 (Host-B in FIGS. 4*a*, 4*b*, 9*a* and 9*b*) and a second host 300 (Host-A in FIGS. 4*a*, 4*b*, 9*a* and 9*b*) are described, with remote memory access being provided between the two hosts. In the present context, it is assumed that the second host 300 is the requester, i.e., the entity requesting access to remote memory, and the first host 200 is the provider, i.e., the entity hosting the remote memory being accessed. Consequently, the network interface controller apparatus may be configured to provide remote access to the memory of the first host for the second host. As will become apparent, access to remote memory can also be requested by the second host and provided by the first host.

To provide remote access to the memory of the first host for the second host, the network interface controller apparatus obtains the memory transaction request from the second host, translates the memory transaction request, and provides the cache transaction request to the first host. After obtaining the response from the first host, it provides information on the response to the second host.

The memory transaction request originates from the second host. Since the network interface controller apparatus is hosted by the first host, the memory transaction requests may be received from the second host via a computer network. Accordingly, the circuitry may be configured to obtain the memory transaction request via a computer network, such as an ethernet-based computer network, from the second host. Accordingly, the information on the response to the cache transaction request may be provided to the second host via the computer network. For example, the circuitry may comprise network interface controller circuitry (e.g., network interface controller circuitry 46 shown in FIG. 4*a*) to communicate via the computer network.

If the communication between the first host and the second host, and in particular between the network interface controller apparatuses 20; 30 of the first and second host, is performed via the computer network, the respective information being exchanged may be encapsulated in network packets. Therefore, the circuitry may be configured to encapsulate the respective information to be provided to the second host in a network packet, and to extract the respective information received from the second host from a network packet. For example, the circuitry may be configured to encapsulate the information on the response to the cache transaction request in a network packet, and to provide the network packet with the information on the response to the cache transaction request to the second host. The corresponding method may comprise encapsulating 270 the information on the response to the cache transaction request in the network packet. Similarly, the circuitry may be configured to obtain the memory transaction request as part of a network packet, and to extract the memory transaction request from the network packet to obtain the memory transaction request. Correspondingly, the method may comprise extracting 220 the memory transaction request from the network packet to obtain the memory transaction request. In this context, the term "encapsulate" may indicate, that the circuitry is configured to generate the payload for the network packet, and to include the respective information in the payload. The term "extract" may indicate that the circuitry is configured to pull out the respective information from the payload of the network packet.

Figure 6:
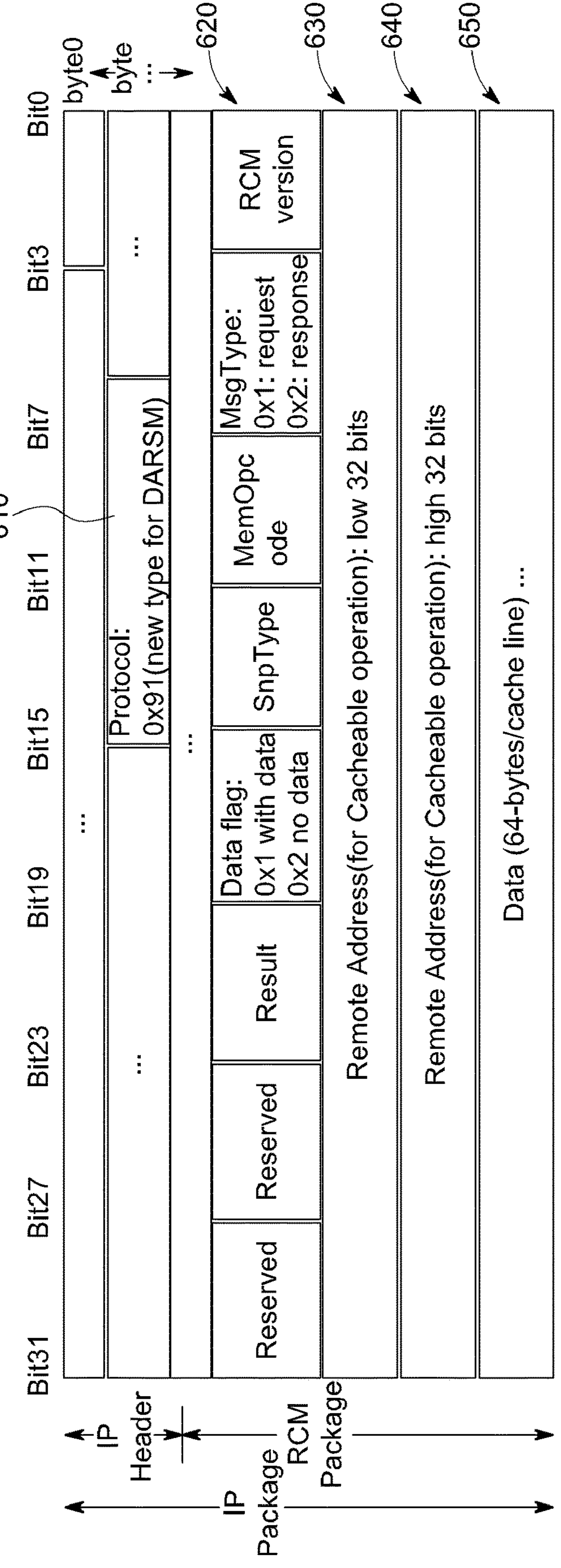
FIG. 6 shows a schematic diagram of a packet suitable for use by a remote memory network interface controller.

The circuitry is configured to translate the memory transaction request to the cache transaction request. In other words, the memory transaction request may comprise a memory operation, which may be translated to a cache operation by the circuitry for the cache transaction request. For example, a memory read transaction request may be translated to a cache read transaction request, and a memory write transaction request may be translated to a cache write transaction request. In this context, the terms "cache transaction request", "cache read transaction request" and "cache write transaction request" indicate, that the request is to be issued via a cache of the first host. However, in case the respective portion of the memory of the first host to which the cache transaction request relates is not currently cached, the respective operations may be performed, by the first host, directly on the memory, without requiring the respective portion of the memory to be cached. For example, FIG. 6 shows an example of a translation between a memory transaction request (CXL.mem Opcode and SnpType) to a cache transaction request (CXL.cache Opcode).

As has been outlined above, the proposed concept may be implemented using the functionalities provided by the Compute eXpress Link (CXL) protocol. Accordingly, the network interface controller apparatus 20 may be configured to communicate with the first host 20 via Compute Express Link. Similarly, the network interface controller 30 may be configured to communicate with the second host 30 via CXL. The CXL protocol defines an entity denoted DCOH (Device Coherency agent or engine). The DCOH is part of the CXL device, e.g., the network interface controller apparatus, that is configured to resolve coherency with respect to device caches. Furthermore, the DCOH may be configured to manage a Bias state of the CXL device. For example, the network interface controller apparatus may comprise the device coherency agent. The circuitry may be configured to provide the cache transaction request to the device coherency agent (e.g., the DCOH) and/or to obtain the response to the cache transaction request from the device coherency agent. The device coherency agent may be configured to perform the communication between the network interface controller apparatus and the first host. In parlance of the CXL standard, the device coherency agent may be configured to provide the cache transaction request as Device-to-Host (D2H) request to the host, and to obtain the response from the host as Host-to-Device (H2D) response from the first host.

As becomes evident, the network interface controller apparatus may be, or implement the functionality of, a CXL device. In particular, the network interface controller apparatus may be, or implement, a so-called Type 2 CXL device. Type 2 devices usually have, in addition to a fully coherent cache, memory, such as High Bandwidth Memory, that is attached to the device. The Type 2 devices are configured to provide transparent access to said memory. This is in contrast to other types of memory being part of a peripheral card, such as memory of a graphics card or of an acceleration card. In theses cases, the memory is usually private. In contrast, in Type 2 devices, the memory is public, to be used to be host.

In the present case, the memory is not part of, or locally attached to, the network interface controller apparatus, but is part of the second host, which is accessible via the network interface controller apparatus.

In general, there are two approaches for handling cache coherency for Type 2 CXL devices—called the Host Bias mode and the Device Bias mode. In the Host Bias mode, the cache coherency is managed by the host. In the Device Bias mode, the cache coherency is managed by the CXL device. In the proposed concept, the cache coherency may be managed by the respective hosts. Accordingly, the network interface controller apparatus may be a Type 2 CXL device that is operated in Host Bias mode. To allow for such Host Bias mode operation of the network interface controller apparatus, the translation between the memory transaction request and the cache transaction request is required. The cache transaction request enables the first host to manage the cache coherency. This may enable cache-coherent local and remote access to the memory of the first host.

The first host executes the memory transaction request and provides the response to the network interface controller apparatus, e.g., to the cache coherency agent. Accordingly, the network interface controller apparatus is configured to obtain the response to the cache transaction request from the first host (e.g., via the device coherency agent). This response is then provided to the second host. At this point, two implementations are possible-either the response, or portions of the response, is/are provided “as is” to the second host (i.e., as cache transaction response), or the response is translated into a suitable memory transaction response. In other words, the circuitry may be configured to provide the response to the cache transaction request (as cache transaction response) to the second host. Alternatively, the circuitry may be configured to translate the response to the cache transaction request to a response suitable for the memory transaction request. Accordingly, the method may comprise translating 260 the response to the cache transaction request to a response suitable for the memory transaction request. For example, the response to the cache transaction request may be suitable for the cache transaction request. Translating the response to the cache transaction request may render the response suitable as response to the memory translation request. For example, a cache read transaction response may be translated into a memory read transaction response according to the semantics of the memory transaction. Accordingly, a cache write transaction response may be translated into a memory write transaction response. More details with respect to the memory transaction and cache transaction semantics of the CXL protocol are given in connection with FIGS. 4*a* and/or 4*b* and FIGS. 9*a* and/or 9*b*. The response suitable for the memory transaction request may be provided as information on the response to the cache transaction request to the second host. For example, as outlined above, the information on the response may be encapsulated and provided (e.g., transmitted) via the computer network to the second host.

Figure 4A:
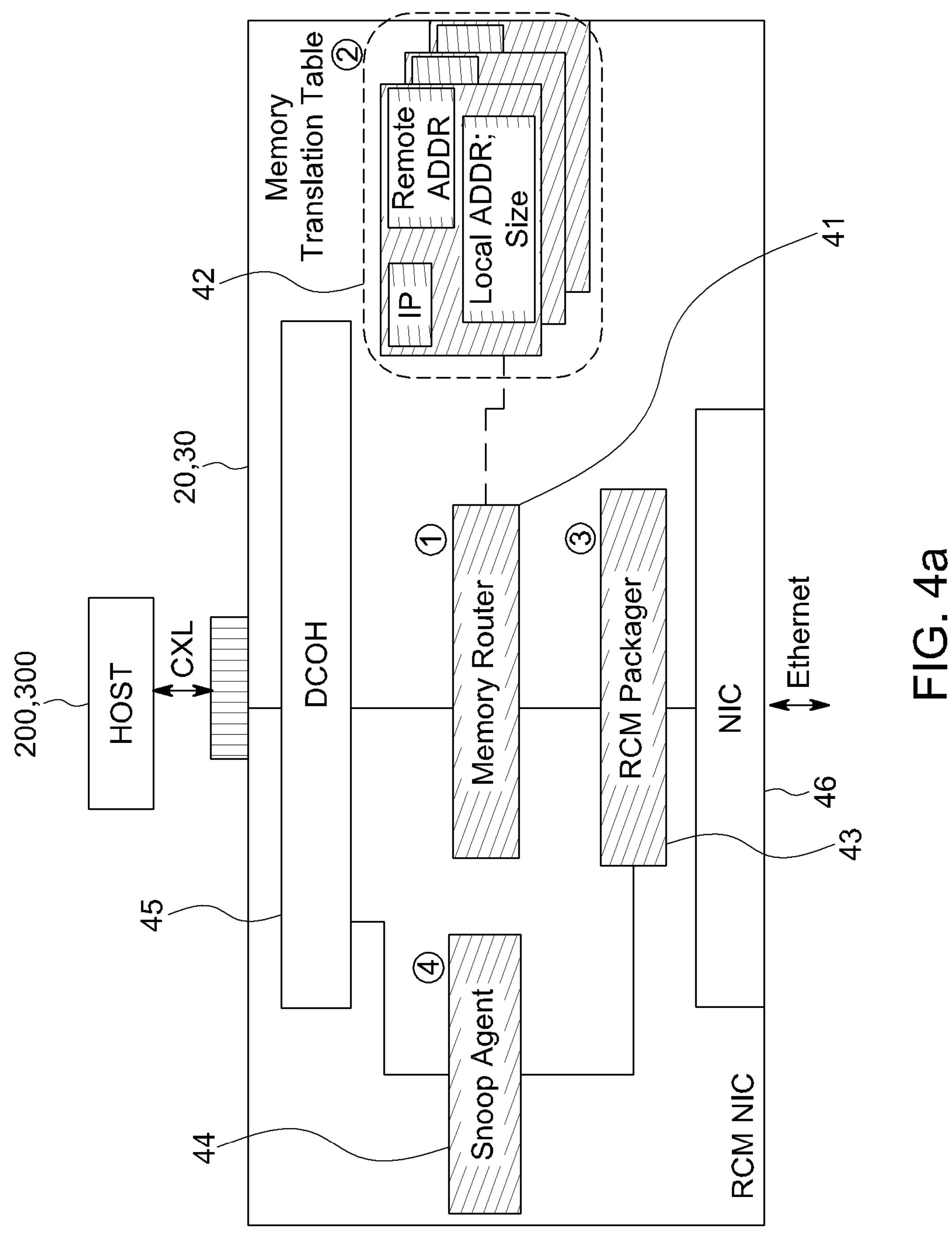
Figures 1, 4B:
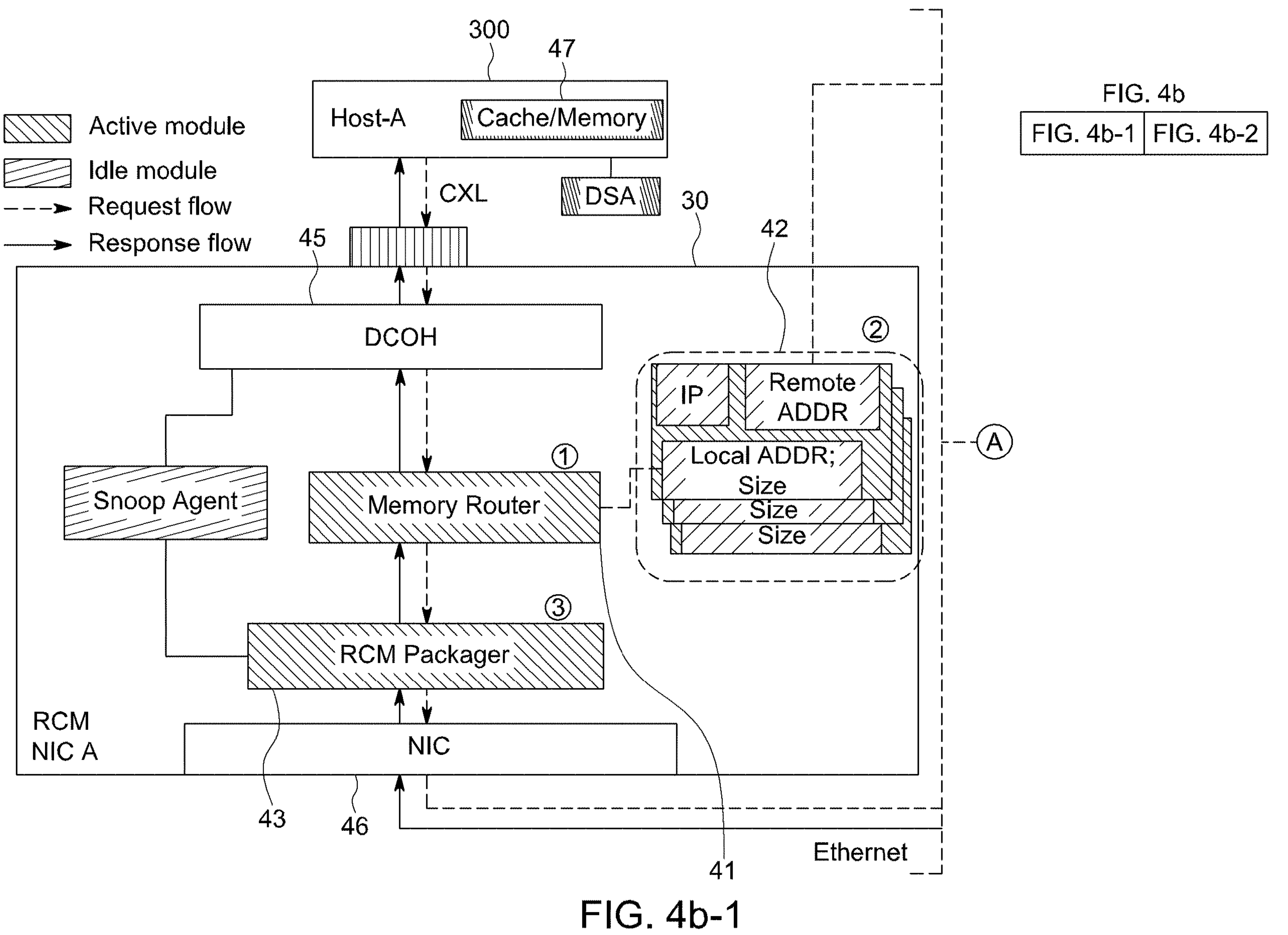
Figures 2, 4B:
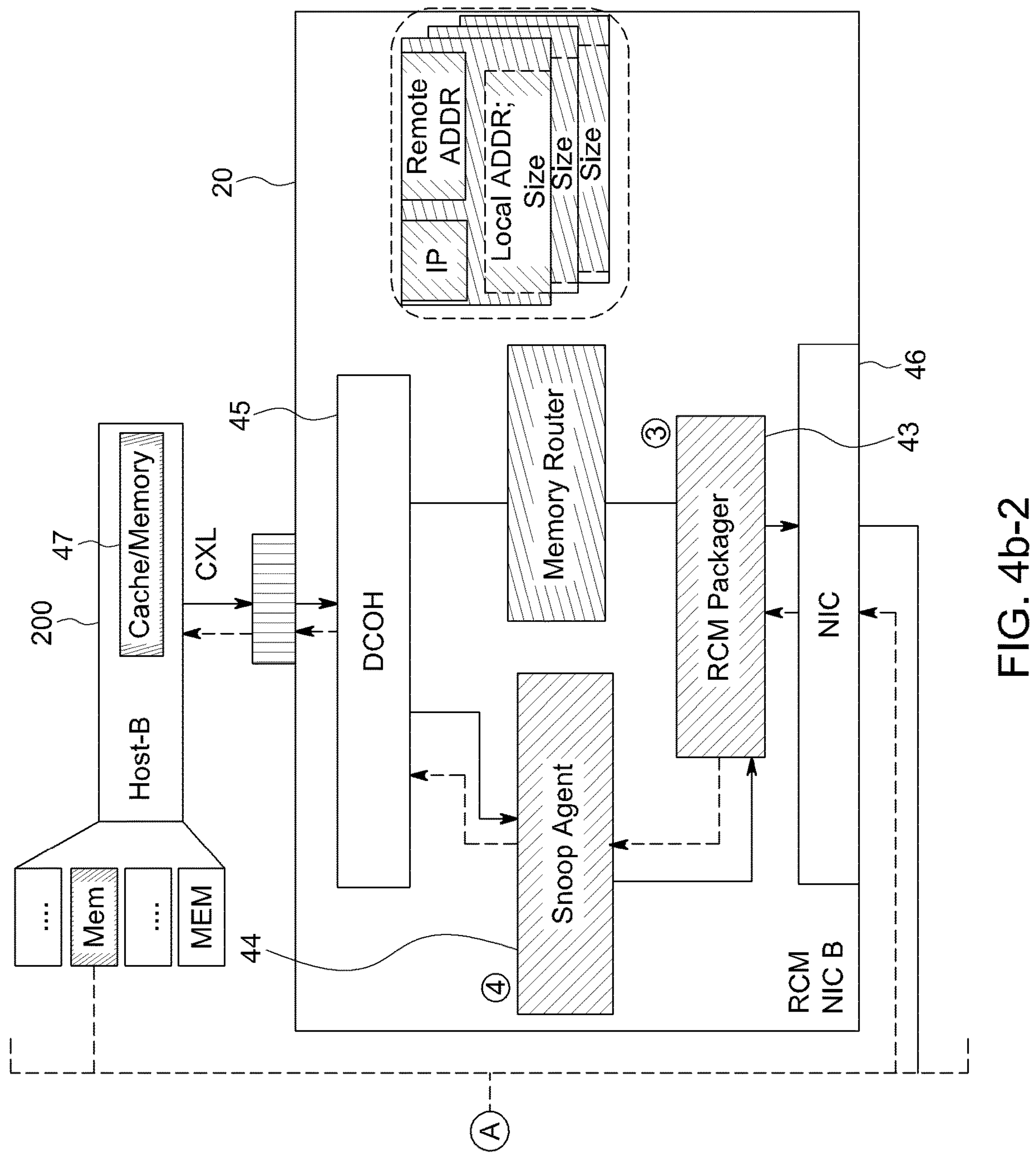

In FIGS. 4*a* and 4*b*, an example of an implementation of the proposed concept is shown. For example, the snoop agent 44 and the RCM packager 43 of the network interface controller apparatuses shown in FIGS. 4*a* and/or 4*b* may be used to implement the above functionality, with the snoop agent 44 being used for the translation, coordination and communication with the coherency agent and the RCM packager, and the RCM packager being used to extract and encapsulate packages. An example of a corresponding flow of data is shown in FIGS. 9*a* and 9*b*.

In the previous description of the proposed concept, the second host is the “requester” and the first host is the “provider”. However, the network interface controller apparatus may also be configured to provide the reverse functionality, e.g., to provide remote access to the memory of the second host for the first host. In this case, the circuitry may be configured to obtain a further memory transaction request with respect to memory of the second host from the first host, provide the further memory transaction request to the second host, obtain information on a response to a further cache transaction request from the second host in response to the further memory transaction request, and provide a response suitable for the further memory transaction request to the first host based on the information on the response to the further cache transaction request.

Figure 3B:
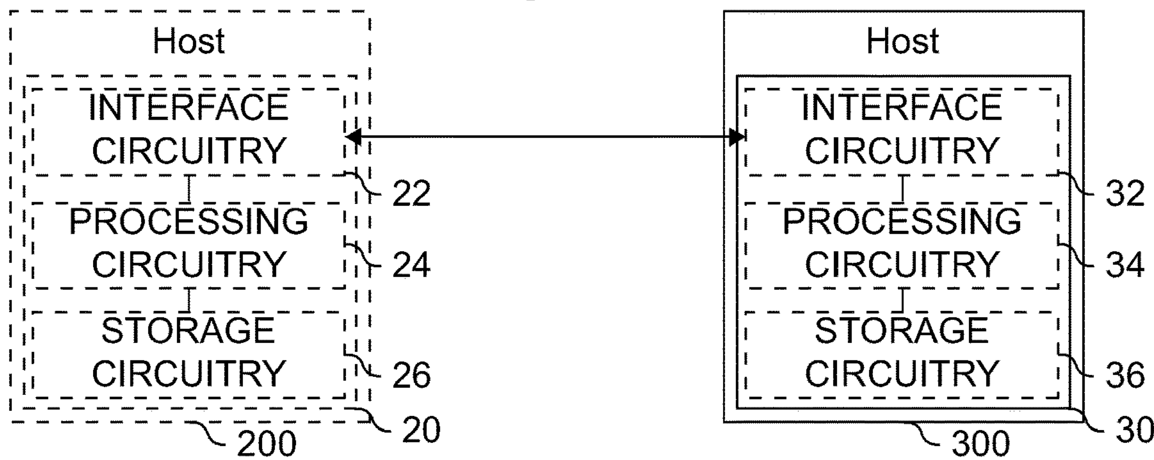
Figure 3C:
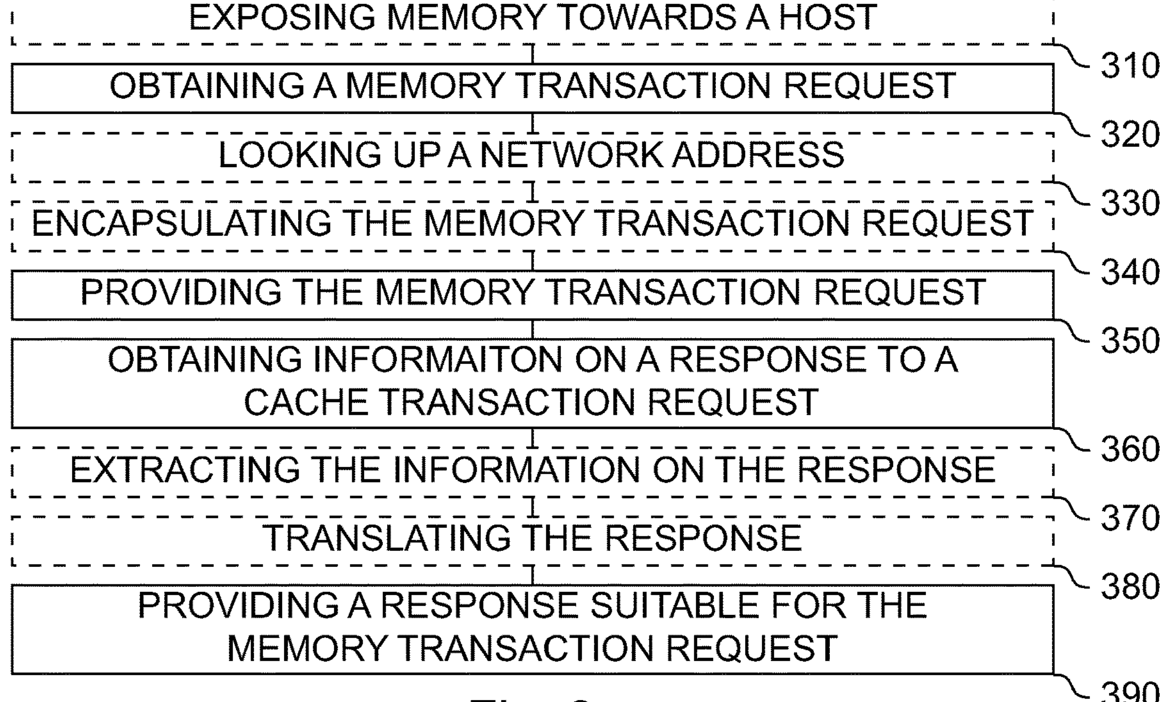

Accordingly, the corresponding method may comprise (as shown in FIG. 3*c*, as the network interface controller apparatus/device 30 is also configured to provide said functionality) obtaining 320 a further memory transaction request with respect to memory of the second host from the first host, providing 350 the further memory transaction request to the second host, obtaining 360 information on a response to a further cache transaction request from the second host in response to the further memory transaction request, and providing 390 a response suitable for the further memory transaction request to the first host based on the information on the response to the further cache transaction request.

This time, the first host is the “requester”, and the second host is the “requester”. Therefore, the network interface controller apparatus is used to provide access to the memory of the second host for the first host. In general, this can be performed by mapping the memory of the second host that is remotely accessible to a memory region that is assigned to the network interface controller apparatus. In other words, the network interface controller apparatus, e.g., the circuitry, may be configured to expose the memory of the second host towards the first host as a region of memory of the network interface controller apparatus. The corresponding method may comprise exposing 310 the memory of the second host towards the first host as a region of memory of the method for the network interface controller. More details of the memory mapping are given in connection with FIGS. 10*a* to 11*d*.

When the first host is the “requester” and the second host is the provider, the flow is reversed. However, depending on whether the host is a “requester” or a “provider”, different tasks are to be performed by the respective network interface controller apparatus.

For example, the circuitry may be configured to obtain the further memory transaction from the first host, e.g., from the device coherency agent, and to forward it to the second host (i.e., to a corresponding network interface controller apparatus of the second host). The network interface controller apparatus of the second host then performs the necessary operations at the second host (translating the further memory transaction request, providing the cache transaction request to the host, obtaining the response to the cache transaction request, and providing information on the response back to the network interface controller apparatus of the first host).

The circuitry may be configured to provide the further memory transaction request to the second host. As outlined earlier, the first and second host may communicate, via the respective network interface controller apparatuses, via a computer network. Therefore, the further memory transaction request may be provided via the computer network. To successfully communicate with the second host, and also to identify which host is associated with the memory being accessed by the first host, a look-up may be performed with respect to a network address (e.g., Internet Protocol address) of the second host. Accordingly, the circuitry may be configured to look up a network address of the second host. The corresponding method may comprise looking up 330 the network address of the second host. For example, the network address may be looked up from a network address data storage of the network interface controller (apparatus). In FIGS. 4*a* and 4*b*, the network address data storage is denoted address translation table 42. For example, the memory transaction request may include information on a local memory address of the memory being accessed. The circuitry may be configured to look-up the network address of the host and the remote address of the memory at the second host based on the local memory address included in the memory transaction request from the network address data storage. An example of fields of data being included in the network address data storage is given in FIG. 5. The further memory transaction request may be provided to the second host based on the network address of the second host. The look-up may be performed by the memory router 41 introduced in connection with FIGS. 4*a* to 4*b*.

Similar to previously described communication with the second host, the circuitry may be configured to provide the further memory transaction request via a computer network to the second host, and to obtain the information on the response to the further cache transaction request via the computer network from the second host. Again, the circuitry may be configured to encapsulate the further memory transaction request in a network packet. Similarly, the method may comprise encapsulating 340 the further memory transaction request in a network packet. The network packet with the further memory transaction request may be provided to the second host. For example, the circuitry may be configured to obtain the information on the response to the further cache transaction request as part of a network packet, and to extract the information on the response to the further cache transaction request from the network packet to obtain the information on the response to the further cache transaction request. Accordingly, the corresponding method may comprise extracting 370 the information on the response to the further cache transaction request from the network packet to obtain the information on the response to the further cache transaction request. Details on the communication via the computer network, and the corresponding encapsulation and extraction tasks, are given with respect to the scenario where the first host is the provider. For example, the extraction and/or encapsulation may be performed by the RCM packager 43.

The processing of the further memory transaction request may be performed by the network interface controller apparatus of the second host and the second host. Once the processing is completed, the information on the response to the further cache transaction request may be obtained (e.g., received) from the second host in response to the further memory transaction request. In other words, the response to the further cache transaction request may be based on the further memory transaction request. The further memory transaction request may be translated into the corresponding further cache transaction request, which may then be provided to the second host (e.g., via the device coherency agent of the network interface controller apparatus of the second host). The second host may provide the response to the further cache transaction request, which may then be provided to the network interface controller apparatus of the first host as information on the response to the further cache transaction request.

As outlined in connection with the first host being the "provider", the information on the response to the further cache transaction request may either comprise the actual response to the further cache transaction request (or portions thereof), or the response may be translated by the network interface controller apparatus of the second host and be provided as response that is suitable for the memory transaction request. Accordingly, the information on the response to the further cache transaction request may comprise the response suitable for the memory transaction request (as translated by the network interface controller apparatus of the second host). Alternatively, the information on the response to the further cache transaction request may comprise the response to the cache transaction request. In this case, the circuitry may be configured to translate the response to the further cache transaction request to the response suitable for the memory transaction request. Accordingly, the method may comprise translating 380 the response to the further cache transaction request to the response suitable for the memory transaction request. For example, the translation of the response to the further cache transaction request may be implemented similar to the translation of the cache transaction request introduced above.

Once the response suitable for the further memory transaction request is generated or received, it is provided to the first host, e.g., via the device coherency agent of the network interface controller apparatus.

As will be introduced in more detail with respect to FIGS. 4*a* and/or 4*b* and FIGS. 9*a* and/or 9*b*, the network interface controller apparatus may comprise one or more sub-components. Likewise, the circuitry of the network interface controller apparatus may be implemented using one or more sub-components. In particular, with reference to FIG. 4*a*, the circuitry may comprise one or more of a memory router 41 (e.g., memory router circuitry/means for determining a routing), a memory translation table 42 (e.g., a storage device, storage circuitry or means for storing information, configured to provide a network address data storage), a packager 43 (e.g., circuitry or means for generating (e.g., encapsulating) and extracting network packets), and a snoop agent (e.g., circuitry or means configured to translate the memory transaction request, to obtain the response to the cache transaction request, and to provide the information on the response), a device coherency engine 45 (e.g., circuitry or means configured to manage cache coherency) and a network interface controller 46 (e.g., circuitry for communicating via an computer network, such as an Ethernet network).

As was alluded earlier, both the network interface controller apparatus 20 of FIG. 2*a* and the network interface controller apparatus 30 of FIG. 3*a* may provide functionality that is suitable for both the first host and the second host. Therefore, the network interface controller apparatus 20 may comprise circuitry configured to provide remote access to the memory of a first host 200 for a second host 300, the first host hosting the network interface controller apparatus, by obtaining an incoming memory transaction request with respect to the memory of the first host from the second host, translating the incoming memory transaction request to the cache transaction request, providing the cache transaction request to the first host, obtaining the response to the cache transaction request from the first host, and providing outgoing information on the response to the cache transaction request to the second host. The circuitry may be configured to provide remote access to the memory of the second host for the first host by obtaining an outgoing memory transaction request with respect to the memory of the second host from the first host, providing the outgoing memory transaction request to the second host, obtaining incoming information on a response to the cache transaction request from the second host in response to the outgoing memory transaction request, and providing a response suitable for the outgoing memory transaction request to the first host based on the incoming information on the response to the cache transaction request.

The interface circuitry 22 may correspond to one or more inputs and/or outputs for receiving and/or transmitting information, which may be in digital (bit) values according to a specified code, within a module, between modules or between modules of different entities. For example, the interface circuitry 22 may comprise interface circuitry configured to receive and/or transmit information. The processing circuitry 24 may be implemented using one or more processing units, one or more processing devices, any means for processing, such as a processor, a computer or a programmable hardware component being operable with accordingly adapted software. In other words, the described function of the processing circuitry 24 may as well be implemented in software, which is then executed on one or more programmable hardware components. Such hardware components may comprise a general-purpose processor, a Digital Signal Processor (DSP), a micro-controller, etc. The storage circuitry 26 may comprise at least one element of the group of a computer readable storage medium, such as a magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the network interface controller apparatus 20, device 20, method and computer program are mentioned in connection with the proposed concept or one or more examples described above or below (e.g. FIGS. 1, 3*a* to 11*d*). The network interface controller apparatus 20, device 20, method and computer program may comprise one or more additional optional features corresponding to one or more aspects of the proposed concept or one or more examples described above or below.

FIG. 3*a* shows a block diagram of an example of network interface controller apparatus or device 30. For example, the network interface controller apparatus or device 30 may correspond to, or implement, the RCM NIC. The network interface controller apparatus 30 comprises circuitry, configured to provide the functionality of the network interface controller apparatus 30. Likewise, the corresponding network interface controller device 30 comprises processing means, configured to provide the functionality of the network interface controller device 30. The components of the network interface controller device are component means, which correspond to the corresponding structural components of the network interface controller apparatus.

For example, the circuitry of the network interface controller apparatus may comprise processing circuitry 34. The circuitry may further comprise interface circuitry 32 and/or storage circuitry 36, which are coupled with the processing circuitry 34. The means for processing of the network interface controller device may be implemented using one or more of the processing circuitry 34, the interface circuitry 32 and the storage circuitry. In general, the functionality of the respective network interface controller apparatus or device may be provided by the processing circuitry 34, with the help of the interface circuitry (for exchanging information) and storage circuitry 36 (for storing information).

The circuitry/means for processing is configured to obtain a memory transaction request with respect to memory of a second host 200 from a first host 300 hosting the network interface controller apparatus. The first host 300 comprises the network interface controller apparatus or device 30. Compared to the examples shown in connection with FIGS. 2*a* to 2*c*, the first host 300 and the second host 200 are reversed. The circuitry/means for processing is configured to provide the memory transaction request to the second host. The circuitry/means for processing is configured to obtain information on a response to a cache transaction request from the second host in response to the memory transaction request. The circuitry/means for processing is configured to provide a response suitable for the memory transaction request to the first host based on the information on the response to the cache transaction request. As becomes evident, the network interface controller apparatus is configured to perform the tasks as described with respect to the network interface controller apparatus/device 20 of FIGS. 2*a* to 2*b* when the first host 200 described in connection with FIGS. 2*a* to 2*c* is the "requester". Correspondingly, the respective functionality may be implemented similar to the functionality described for this case in connection with FIGS. 2*a* to 2*c*. Moreover, the network interface controller apparatus/device 30 may be configured to provide the functionality of the network interface controller apparatus/device 20 of FIGS. 2*a* to 2*b* when the first host 200 described in connection with FIGS. 2*a* to 2*b* is the "provider".

In FIG. 3*b*, the interaction between the two hosts is shown. FIG. 3*b* shows a block diagram of an example of the first host 300 and the second host 200 comprising the network interface controller apparatuses or devices 20; 30. FIG. 3*b* further shows a system comprising the network interface controller apparatus or device 20 of FIG. 2*a* and the network interface controller apparatus or device 30 of FIG. 3*a*. FIG. 3*b* further shows a system comprising the first host 200 and the second host 300.

FIG. 3*c* shows a flow chart of an example of a corresponding method for a network interface controller (e.g., the network interface controller apparatus or device 30). The method comprises obtaining 320 a memory transaction request with respect to memory of a second host 300 from a first host 200 hosting the network interface controller. The method comprises providing 350 the memory transaction request to the second host. The method comprises obtaining 360 information on a response to a cache transaction request from the second host in response to the memory transaction request. The method comprises providing 390 a response suitable for the memory transaction request to the first host based on the information on the response to the cache transaction request. Optionally, the method may comprise exposing 310 the memory of the second host towards the first host as a region of memory of the network interface controller. Optionally, the method may comprise looking up 330 a network address of the second host. Optionally, the method may comprise encapsulating 340 the further memory transaction request in a network packet. Optionally, the method may comprise extracting 370 the information on the response to the further cache transaction request from the network packet to obtain the information on the response to the further cache transaction request. Optionally, the method may comprise translating 380 the response to the further cache transaction request to the response suitable for the memory transaction request.

The features and functionalities of the network interface controller apparatus or device 30, of the corresponding method and of a corresponding computer program have been introduced in connection with FIGS. 2*a* to 2*c*. However, in a basic configuration, the network interface controller apparatus or device 30, the corresponding method and the corresponding computer program may be limited to the functionality that is required for the first host being the "requester". Additional functionality or features may be added, e.g., up to feature parity with the network interface controller apparatus or device, method and computer program introduced in connection with FIGS. 2*a* to 2*c*.

The interface circuitry 32 may correspond to one or more inputs and/or outputs for receiving and/or transmitting information, which may be in digital (bit) values according to a specified code, within a module, between modules or between modules of different entities. For example, the interface circuitry 32 may comprise interface circuitry configured to receive and/or transmit information. The processing circuitry 34 may be implemented using one or more processing units, one or more processing devices, any means for processing, such as a processor, a computer or a programmable hardware component being operable with accordingly adapted software. In other words, the described function of the processing circuitry 34 may as well be implemented in software, which is then executed on one or more programmable hardware components. Such hardware components may comprise a general-purpose processor, a Digital Signal Processor (DSP), a micro-controller, etc. The storage circuitry 36 may comprise at least one element of the group of a computer readable storage medium, such as a magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the network interface controller apparatus 30, device 30, method and computer program are mentioned in connection with the proposed concept or one or more examples described above or below (e.g. FIGS. 1 to 2*c*, 4*a* to 11*d*). The network interface controller apparatus 30, device 30, method and computer program may comprise one or more additional optional features corresponding to one or more aspects of the proposed concept or one or more examples described above or below.

With respect to FIGS. 4*a* and 4*b*, an example of an implementation of the network interface controller apparatus or device of FIGS. 2*a* to 3*c* is shown. FIG. 4*a* shows a schematic diagram of an example of a remote memory network interface controller (RCM NIC) for the respective hosts. In the proposed concept, as shown in FIG. 4*a*, an RCM NIC to natively share/migrate data among hosts is proposed. For example, the RCM NIC may implement the network interface controller apparatus or device of FIGS. 2*a* to 3*c*. Besides an existing CXL DCOH (Device Coherency) module 45 (i.e. circuitry) and a common NIC circuitry 46, the following additional components are proposed to implement the RCM NIC. A memory router 41 is configured to obtain CXL.mem (memory transaction) requests and to translate the local address to a remote address by looking up the address in an address translation table 42. Each entry of the address translation table 42 may record the memory mapping information including one or more of a local memory address, a memory block size, a remote host's IP, and a memory address on the remote host. More details are shown in FIG. 5. An RCM packager 43 encapsulates/uncapsulates (extracts) RCM packages, e.g., based on standard IP (Internet Protocol) packages. A snoop agent 44 is configured to translate original CXL.mem (memory transaction) fields to CXL.cache (cache transactions) fields for the remote host and obtain a CXL.cache response (response to the cache transaction request) from the DCOH, interpret the response back to CXL.mem (to a response suitable for the memory transaction request) and provide it to the RCM Packager. The new components 41-44 are combined with the NIC 46 and the DCOH 45 to implement the concept. For example, the components 41 may be implemented together in shared circuitry, e.g., a processor or programmable hardware component, or using separate pieces of circuitry. For example, components 41-44 may be implemented together in shared circuitry, and the DCOH and the NIC may be implemented separately.

In the present disclosure, a method and flow are also proposed to use RCM to access remote memory, including enumeration of the RCM NIC devices by hosts and the mechanism to setup the memory mapping for remote memory access. An example of the high-level flow is introduced in connection with FIG. 4*b*. FIG. 4*b* shows a schematic diagram of an example of an access to remote memory being performed via a remote memory network interface controller. FIG. 4*b* may show an architecture of a usage of the RCM NIC. In FIG. 4*b*, as an example, two hosts are shown-Host-A 300 (e.g., the second host) as requester, and Host-B (e.g., the first host) 200 as remote memory provider.

For enumeration, both hosts 200; 300 with RCM NICs may enumerate a new device and determine the capability of memory and cache, e.g., following the CXL standard. Each host may keep this memory in RCM as "offline" first, then expose memory attributes to the operating system (OS).

Next, memory mapping is discussed. The provider (e.g. Host-B 200) may deliver memory block's attributes to the requester (e.g. Host-A 300). The requester may map the remote memory block (of cache/memory 47) to memory block in the own RCM NIC, and set mapping info into a table in RCM NIC. The syncing and mapping may use a mature mechanism (e.g. Ethernet Operation, Administration and Maintenance, OAM). In effect, the requester may access the provider's block just like local memory.

For accessing the memory, the requester (Host-A 300) may trigger a CXL.mem request (e.g., a memory transaction request). In NIC_A 30 (e.g., the network interface controller apparatus or device 20), the Memory Router 41 may parse CXL.mem, and look up an entry in the Memory Translation Table 42 by Address from CXL.mem and obtain a definite remote host's memory address by attributes (IP & Remote Address & Size) in the entry.

The RCM Packager 43 of Host-A 300 may organize (all of) the elements (Remote Address/SnpType . . . as shown in FIG. 6) and send the elements in an RCM packet to RCM NIC_B 20 via Ethernet.

The RCM packager 43 in Host-B may unpack and deliver the information to Snoop Agent 44. The Snoop Agent may translate the (memory transaction) request to CXL.cache Semantics (e.g., to a cache transaction request) for Host-B 200, The DCOH 45 may handle interaction with Host-B 200 for data.

The DCOH 45 of Host-B may provide the result to Snoop Agent 44. The Snoop Agent may parse the response of CXL.cache (e.g., the cache transaction request), and send the response back to Memory Router 43 in RCM NIC_A 30 via the RCM Packagers 43. The Memory Router 41 of NIC_A 30 may interpret the response and generate a standard CXL.mem response (response to the memory transaction) to Host-A 300 with/without data, finishing the memory request.

In the example, NIC_A uses the Memory Router 41, the Memory Translation Table 42, and the RCM Packager 43, and NIC_B uses the RCM Packager 43 and the Snoop Agent 44 for requests from Host-A to Host-B, the responses use the reverse path.

In various examples, RCM uses instruction-level semantics (such as MemRd (Memory Read)/RdCurr (ReadCurrent)), and avoid the use of API, which may simplify the programing model for usages. Moreover, RCM may expose and map local virtual memory (Host-managed Device Memory) to remote host's physical memory. RCM may translate CXL.mem (memory transaction requests) to Cache coherence instructions (CXL.cache, cache transaction instructions) for up-to-date data in remote memory. This may enable the performance of cacheable and coherent operations, with a higher performance compared with operations of I/O. Although RCM accesses cache line data, for larger data blocks, the host may also use DSA (Data Streaming Operator) (as shown for Host-A 300 in FIG. 4*b*) to implement batches of operations with CPU off-load, which yields high performance. It can be flexibly used in various scenarios.

In connection with FIGS. 4*a* and 4*b*, four new modules were proposed:

The Memory Router 41. The Memory Router may parse the CXL.mem request (e.g., the memory transaction request), decode the address, and map the address to the corresponding memory block in the Memory Translation Table 42. Then the Memory Router may determine the memory address in the remote host by IP and remote address and provide the info and SnpType (Snoop Type-one of SnpData, SnpCur and SnpInv) and MemOpcode (derived from CXL.mem request) to RCM Packager. If the SnpType is SnpData, Snoop may be required, the requester may be provided with a shared or exclusive copy of the line. If the SnpType is SnpCur, Snoop may be required, the requester may be provided with current value of the line, promises not to cache. If the SnpType is SnpInv, Snoop may be required, and the requester is provided with an exclusive copy of the line. The different MemOpcodes (for the memory transaction requests) are shown in FIG. 7.

The Memory Translation Table 42 may comprise a table that includes the IP of the remote memory host and memory attributes. Each entry of table may indicate a block of native memory mapped to a definite remote host's memory block. For example, RCM may use MmCfg (Memory Mapping Configuration) to set the information for mapping memory between hosts.

FIG. 5 shows a table of an example of fields of a Memory Translation Table. For example, the Memory Translation Table may include an IP field, e.g., of type integer, which may represent the IP address and take up one MmCfg register. The IP field may indicate the remote host that provides the physical memory mapped to native memory. For example, the Memory Translation Table may comprise a Remote Address field, e.g., of type long integer, which may take up one MmCfg register. The Remote Address field may provide the address being mapped to the local memory block. For example, the Memory Translation Table may comprise a Local Address field, e.g., of type long integer, which may take up one MmCfg register. The Local Address field may provide the system address of a memory range of the memory block. On the local host, the Local Address may be used to access the memory block. For example, the Memory Translation Table may comprise a Memory Size field, e.g., of type long integer, which may indicate the size of one memory block in the local address system, with the memory size being the same as the remote memory size.

The RCM Packager 43 is the third new block. For example, RCM may expand the IP with a value 0x91 (see FIG. 6 610), which indicates that the packet being transmitted is an RCM packet (similar to TCP/IP). In the request flow, in RCM NIC_A 30, the RCM Packager 43 may encapsulate key information derived from CXL.mem. In RCM NIC_B 20, the RCM Packager 43 may un-capsulates (extract) and deliver the information to the Snoop Agent 44. In the response flow, in RCM NIC_B 20, the RCM Packager 43 may encapsulate the response information from the Snoop Agent. In RCM NIC_A 30, the RCM Packager 43 may un-capsulate (extract) and deliver the information to the Memory Router 41.

The packet may contain data for a CXL.mem writing request, or for a CXL.mem reading response.

FIG. 6 shows a schematic diagram of an (IP) packet suitable for use by a remote memory network interface controller. As indicated earlier, 0x91 may be set as protocol type 610 for RCM in the IP header. The IP header is followed by the RCM package, which comprises a first row (or 32 bits) comprising two reserved field, a result field, a data flag (0x1 with data, 0x2 no data), the SnpType, the MemOpcode, the MsgType (0x1 request, 0x2 response), and the RCM version. The second and third row comprise low 32 bits and high 32 bits of the Remote Address (for cacheable operation). The fourth and following rows comprise the data (with 64 bytes per cache line).

In FIG. 6, RCM version may indicate the version of RCM, with the default value being "1". The MsgType may indicate the type of message for CXL.mem-either request or response. MemOpcode and SnpType may be derived from CXL.mem (see FIG. 7). The data flag may indicate whether the RCM packet comprises data in the data field. The result may indicate a cacheable result for the CXL.mem response. The Remote Address may indicate the memory address in the remote host, which may be translated back to the native address for the CXL.mem response in the Memory Router.

The Snoop Agent 44 may receive information from the RCM Packager 43. For CXL.mem reading/writing requests, it may translate CXL.mem semantics (based on MemOpcode and SnpType) to CXL.cache (i.e., translate the memory transaction request to the cache transaction request) for the DCOH. The Snoop Agent 44 may interact with Host-B, accessing up-to-date data from Host-B, or write back data by cacheable operation to Host. RCM may expose the memory block to the OS as Host-bias-memory, so it might not consider forward-request from CXL.mem. A detailed mapping is shown in FIG. 7.

FIG. 7 shows a table of an example of a translation between memory transaction requests and cache transaction requests. FIG. 7 may show a translation between CXL.mem semantics from Host-A into CXL.cache for Host-B. In FIG. 7, the two memory read transaction requests MemRd and MemRdData, with the different SnpTypes, are translated to the cache read transaction request RdCurr (Read Current, CXL.mem-MemRd to CXL.cache RdCurr and CXL.mem-MemRdData to CXL.cache RdCurr). For MemInv (Memory Invalidate) with SnpType SnpInv, no translation and forwarding might be needed, and the Memory Router may return Cmp (Complete) to the host directly. The two memory write transaction requests MemWr and MemWrP, with the respective SnpTypes, are mapped to the cache transaction request MemWr (Memory Write, CXL.mem-MemWr to CXL.cache MemWr and CXL.mem-MemWrP to CXL-.cache MemWr). FIG. 7 may show a basic mapping for accessing data, which may be extended in the future.

In various examples, the ACPI table may be extended for Remote Memory in Software. The BIOS may obtain the respective attributes of the memory in the RCM NIC and expose the memory to the OS via the ACPI table. The proposed concept may extend attributes in the HMAT (Heterogenous Memory Attribute Table) and the MAT (Memory Affinity Table). FIG. 8 shows a table of an example of the memory affinity table and heterogeneous memory attribute table entries. For example, the HMAT.Creator ID field may be set to "RCM memory", thus expanding to a new value to indicate an RCM device for the OS. The MAT.Flags field may be set to 1 to enable flags for hot-plugging. The MAT.Flags. Hot field may be set to 1 to enable hot-plugging for the RCM memory towards the OS.

In the following, examples are given for the read and write flows, respectively. In the examples, Host-A 300 is the requester, Host-B 200 is the memory provider.

FIG. 9*a* shows a schematic diagram of an example of a data flow of a memory read operation (CXL.mem MemRd). (1) Host-A 300 may trigger the reading request (CXL.mem). DCOH 45 may interpret and forward elements to the Memory Router 41. The Memory Router may look up exact entry by address derived from CXL.mem in the Memory Translation Table 42. (2) The Memory Router 41 may fetch IP and other information and deliver them to the RCM Packager 43. (3) The RCM Packager 43 may encapsulate the RCM packet following the RCM protocol (FIG. 6) and send a message to RCM NIC_B 20. (4) The message may be un-capsulated (extracted) by the RCM Packager 43 and delivered to the Snoop Agent 44 in RCM NIC_B 20. (5) The Snoop Agent 44 may translate the request to CXL.cache semantics towards DCOH. (6) The DCOH 45 may handle the CXL.cache D2H (Device-to-Host) request to Host-B 200 and fetch up-to-date data (from peer cache 910 or memory 920). (7) The DCOH 45 may return the response with data to the Snoop Agent 44. (8) The Snoop Agent may forward information with data to RCM Packager 43. (9-10) In RCM NIC_A 30, the RCM Packager 43 may receive the response, un-capsulate (extract) the response and forward the response with the data to the Memory Router 41. (11) The Memory Router 41 may fill fields of a standard-compliant CXL.mem response, and forward it to the DCOH 45 of RCM-NIC_A 30. The DCOH may give the response back to Host-A, finishing the CXL.mem request.

It may be noted that the Memory Router 41, the Memory Translation Table 42, the RCM Packager 43 and the Snoop Agent, and the flows of data entering and exiting said components, are added to implement the proposed concept.

The writing flow is shown in FIG. 9*b*. FIG. 9*b* shows a schematic diagram of an example of a data flow of a memory write operation (CXL.mem MemWr). (1) Host-A 300 may trigger the writing request (CXL.mem). DCOH 45 may interpret and forward elements to the Memory Router 41. The Memory Router may look up exact entry by address derived from CXL.mem in the Memory Translation Table 42. (2) The Memory Router 41 may fetch IP and other information and deliver them to the RCM Packager 43. (3) The RCM Packager 43 may encapsulate the RCM packet following the RCM protocol (FIG. 6) and send a message to RCM NIC_B 20. (4) The message may be un-capsulated (extracted) by the RCM Packager 43 and delivered to the Snoop Agent 44 in RCM NIC_B 20. (5) The Snoop Agent 44 may translate the request to CXL.cache semantics towards DCOH. (6) The DCOH 45 may handle the CXL-.cache D2H (Device-to-Host) request to Host-B 200 and write back data (to peer cache 910 or memory 920). (7) The DCOH 45 may return the response with data to the Snoop Agent 44. (8) The Snoop Agent may organize information to the RCM Packager 43. (9-10) In RCM NIC_A 30, the RCM Packager 43 may receive the response, un-capsulate (extract) the response and forward the response with the data to the Memory Router 41. (11) The Memory Router 41 may fill fields of a standard-compliant CXL.mem response with the native address, and forward it to the DCOH 45 of RCM-NIC_A 30. The DCOH may give the response back to Host-A, finishing the CXL.mem request.

In the following, the initialization of RCM and mapping to peer host's memory is discussed.

FIG. 10*a* shows a block diagram of an example of an apparatus or device 1000 for initializing a network interface controller apparatus or device, such as the network interface controller apparatus or device of FIG. 2*a* or 3*b*, in a host. For example, at least one of the hosts, e.g., the first host 200 and/or the second host 300, may comprise the apparatus or device 1000. In the following, the apparatus or device 100 is hosted by the first host 200. As outlined in connection with the previous figures, the network interface controller apparatus or device is configured to provide remote access to the memory of one or more second hosts 300 for the first host.

The apparatus 1000 comprises circuitry, configured to provide the functionality of the apparatus 1000. Likewise, the corresponding device 1000 comprises processing means, configured to provide the functionality of the device 1000. The components of the device are component means, which correspond to the corresponding structural components of the apparatus.

For example, the circuitry of the network interface controller apparatus may comprise processing circuitry 1004. The circuitry may further comprise interface circuitry 1002 and/or storage circuitry 1006, which are coupled with the processing circuitry 1004. The means for processing of the network interface controller device may be implemented using one or more of the processing circuitry 1004, the interface circuitry 1002 and the storage circuitry. In general, the functionality of the respective apparatus or device may be provided by the processing circuitry 1004, with the help of the interface circuitry 1002 (for exchanging information) and storage circuitry 1006 (for storing information).

The circuitry/means for processing is configured to obtain information on the network interface controller apparatus being configured to provide remote access to the memory of the one or more second hosts from the network interface controller apparatus. The circuitry/means for processing is configured to include the network interface controller apparatus as hot-pluggable memory device in a system description data structure being exposed to an operating system of the first host.

FIG. 10*b* shows a flow chart of an example of a corresponding method for initializing a network interface controller in a host. The method comprises Obtaining 1011 information on the network interface controller being configured to provide remote access to the memory of the one or more second hosts from the network interface controller. The method comprises including 1012 the network interface controller as hot-pluggable memory in a system description data structure being exposed to an operating system of the first host.

In the following, the functionality of the apparatus, device, method, and of a corresponding computer program is introduced in connection with the apparatus. Features introduced in connection with the apparatus may likewise be introduced into the device, method, and computer program The circuitry is configured to obtain the information on the network interface controller apparatus from the network interface controller apparatus. As will become evident, the network interface controller apparatus may expose the information on the network interface controller apparatus towards the apparatus, e.g., via a memory or storage register, or via a message being transmitted during an initialization and training of the network interface controller apparatus (as shown in FIG. 10*c*) being performed by a Basic Input/Output System (BIOS) or Universal Extensible Firmware Interface (UEFI) of the host. For example, the apparatus may be implemented by the BIOS or UEFI of the first host.

The circuitry is configured to include the network interface controller apparatus as hot-pluggable memory device in a system description data structure being exposed to an operating system of the first host. In particular, as further shown in connection with FIG. 10*c*, the network interface controller apparatus may be registered in one or more ACPI (the advanced configuration and power interface) tables, such as the HMAT (Heterogeneous Memory Attribute Table) and/or the MAT (Memory Affinity Table). In other words, the network interface controller apparatus may be included in a heterogeneous memory attributes table and/or a memory affinity table specified by the advanced configuration and power interface specification. In particular, the network interface controller apparatus is included as hot-pluggable memory device in a table specified by the advanced configuration and power interface specification. As shown in connection with FIG. 10*c*, the HMAT.Creator ID may be set to an appropriate identifier reserved for the network interface controller apparatus. In the MAT, the MAT.Flags may be enabled, and the MAT.Flags. Hot Pluggable may be set to 1.

More details are given with the example shown in connection with FIG. 10*c*.

The interface circuitry 1002 may correspond to one or more inputs and/or outputs for receiving and/or transmitting information, which may be in digital (bit) values according to a specified code, within a module, between modules or between modules of different entities. For example, the interface circuitry 1002 may comprise interface circuitry configured to receive and/or transmit information. The processing circuitry 1004 may be implemented using one or more processing units, one or more processing devices, any means for processing, such as a processor, a computer or a programmable hardware component being operable with accordingly adapted software. In other words, the described function of the processing circuitry 1004 may as well be implemented in software, which is then executed on one or more programmable hardware components. Such hardware components may comprise a general-purpose processor, a Digital Signal Processor (DSP), a micro-controller, etc. The storage circuitry 1006 may comprise at least one element of the group of a computer readable storage medium, such as a magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the apparatus 1000, device 1000, method and computer program are mentioned in connection with the proposed concept or one or more examples described above or below (e.g. FIG. 1*a* to 9*b*, 11*a* to 11*d*). The apparatus 1000, device 1000, method and computer program may comprise one or more additional optional features corresponding to one or more aspects of the proposed concept or one or more examples described above or below.

In the following, the initialization is described in more detail with respect to the RCM NIC described in connection with FIGS. 4*a* to 9*b*. Handles for RCM may be added in the BIOS and in the OS. In the following, Linux OS is used to illustrate the handle for RCM. For example, in Linux OS, MEMORY_HOTREMOVE and HAVE_BOOTMEM_INFO_NODE may be enabled in the OS, a node type ZONE_RCM_MOVABLE_MEMORY may be added, and a function "Sparse_RCM_memory" may be added to parse RCM memory.

In the following, an example for the initialization of RCM is given. As a first task, the RCM NIC may be initialized in the BIOS. FIG. 10*c* shows a flow of an example of an initialization of remote memory in the BIOS on hosts. The host may enter 1021 the BIOS and trigger the training to confirm supporting CXL 1022. If no CXL device is confirmed or training fails, the BIOS may continue with other flows. Then, the host may obtain 1023 the flags Mem_Capable and Cache_Capable from CXL DEVSEC, which the RCM vendor may hard-code as "1" indicating memory and cache capacity supported. If the flags are not obtained, the BIOS may handle other CXL flows. Then the host may obtain 1024 the flag Memory_Class as expanded value "100" (reserved in CXL SPEC) for RCM memory. If this is not the case, the BIOS may handle other memory flows. Then, the BIOS may obtain memory attributes and map the memory into system address space 1025. BIOS may collect the information and report it to the OS via ACPI. For HMAT and MAT, "MAT.Flags.Enabled" may be set 1026 as "1" and "MAT.Flags. Hot Pluggable" as "1". These indicate to the OS to treat this memory as "movable" (e.g., hot-pluggable). Additionally, "HMAT.creator ID" may be set 1026 as a new value "RCM", which means that RCM and OS may modify "ZONE_RCM_MOVABLE_MEMORY" to "1" for memory block without triggering an interrupt caused by physically hot-plugging. Then other ACPI tables may be filled 1027, other BIOS features may be run 1028 and the host may switch to the OS. Of these components, components 1024 and 1026 may be added to the BIOS to support the proposed concept.

As a second task, RCM may be initialized in the OS.

FIG. 11*a* shows a block diagram of an example of an apparatus or device 110 for initializing a network interface controller apparatus or device 20; 30 in an operating system of a first host. The apparatus comprises circuitry configured to perform the method shown in the following in connection with FIG. 11*b*.

The apparatus 110 comprises circuitry, configured to provide the functionality of the apparatus 110. Likewise, the corresponding device 110 comprises processing means, configured to provide the functionality of the device 110. The components of the device are component means, which correspond to the corresponding structural components of the apparatus.

For example, the circuitry of the network interface controller apparatus may comprise processing circuitry 114. The circuitry may further comprise interface circuitry 112 and/or storage circuitry 116, which are coupled with the processing circuitry 114. The means for processing of the network interface controller device may be implemented using one or more of the processing circuitry 114, the interface circuitry 112 and the storage circuitry. In general, the functionality of the respective apparatus or device may be provided by the processing circuitry 114, with the help of the interface circuitry 112 (for exchanging information) and storage circuitry 116 (for storing information).

FIG. 11*b* shows a flow chart of an example of a method for initializing a network interface controller apparatus or device in an operating system. The method comprises obtaining 1111 information on the network interface controller apparatus or device from a system description data structure being exposed to the operating system of the first host. The method comprises setting 1112 a physical memory range for the network interface controller apparatus or device.

In the following, the functionality of the apparatus, device, method, and of a corresponding computer program is introduced in connection with the method. Features introduced in connection with the method may likewise be introduced into the apparatus, device, and computer program.

The method starts where the apparatus, device, method, and computer program of FIGS. 10*a* to 10*c* have terminated—it obtains information on the network interface controller apparatus or device from a system description data structure being exposed to the operating system of the first host, such as at lease one ACPI table. In other words, the method may comprise parsing the information on the network interface controller apparatus or device from at least one ACPI table, such as the HMAT and/or the MAT. For example, it may detect the HMAT.Creator ID of the network interface controller apparatus or device, and/or the MAT.Flags. Hot Pluggable being set to 1.

From that information, the network interface controller apparatus or device may be identified. An appropriate memory range is set for the network interface controller apparatus or device. Accordingly, the method comprises setting 1112 the physical memory range for the network interface controller apparatus or device. The flag MAT-.Flags.Hot Pluggable may indicate that the memory is to be mapped to remote memory, and that the memory is not to be used before the mapping (1114) occurs. More details are shown in connection with the example of FIG. 11*c*.

Once the memory range of the network interface controller apparatus or device is set, the remote memory may be mapped to the memory range of the network interface controller apparatus or device. Accordingly, the method may further comprise obtaining 1113 information on the remote memory shared by the one or more second hosts. For example, the information on the remote memory may include the remote memory address, the size of the remote memory, and a network address of the host providing the remote memory. In other words, the information on the remote memory may comprise one or more of the network address of the one or more second hosts, the remote memory address of the remote memory, and the size of the remote memory. The method may comprise mapping 1114 the remote memory to local memory in the physical memory range of the network interface controller apparatus or device. For example, the mapping 1114 may comprise assigning a local memory address to the remote memory and storing the local memory address together with the remote memory address, the size of the memory and the network address of the memory in the network address data storage (e.g., address translation table). Accordingly, the method may comprise including 1115 information on the correspondence between local memory and remote memory and the network address in the network address data storage of the network interface controller apparatus or device.

In some examples, the method may further comprise features of the method shown in connection with FIG. 10*b*. In particular, the method may comprise obtaining 1011, by a basic input/output system of the first host, information on the network interface controller apparatus being configured to provide remote access to the memory of the one or more second hosts from the network interface controller apparatus, and including 1012, by the basic input/output system, the network interface controller apparatus as hot-pluggable memory device in a system description data structure being exposed to the operating system of the first host. Details on these features are given in connection with FIGS. 10*a* to 10*c*.

The interface circuitry 112 may correspond to one or more inputs and/or outputs for receiving and/or transmitting information, which may be in digital (bit) values according to a specified code, within a module, between modules or between modules of different entities. For example, the interface circuitry 112 may comprise interface circuitry configured to receive and/or transmit information. The processing circuitry 114 may be implemented using one or more processing units, one or more processing devices, any means for processing, such as a processor, a computer or a programmable hardware component being operable with accordingly adapted software. In other words, the described function of the processing circuitry 114 may as well be implemented in software, which is then executed on one or more programmable hardware components. Such hardware components may comprise a general-purpose processor, a Digital Signal Processor (DSP), a micro-controller, etc. The storage circuitry 116 may comprise at least one element of the group of a computer readable storage medium, such as a magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the apparatus 110, device 110, method and computer program are mentioned in connection with the proposed concept or one or more examples described above or below (e.g. FIG. 1*a* to 10*c*, 11*c* to 11*d*). The apparatus 110, device 110, method and computer program may comprise one or more additional optional features corresponding to one or more aspects of the proposed concept or one or more examples described above or below.

FIG. 11*c* shows a schematic diagram of an example of an initialization of remote memory (RCM) in an operating system of a host (Host-A as requester). The host may enter 1121 the OS (by starting 1122 the kernel and initializing 1123 the boot memory). The host may parse 1124 memory attributes (such as "Sparse_RCM_Memory" in the ACPI), and use added function to parse 1125 the added memory attributes: "HMAT.Creator ID" and "MAT.Flags. Hot Pluggable". These attributes indicate the memory should be mapped with remote memory and should not be used before mapping behavior. The host may set 1126 ranges of physical memory (relative block) in ZONE_RCM_MOVABLE_MEMORY as "0". The OS may parse other attributes and continue the booting process 1127. Of these components, components 1124, 1125 and 1126 may be added to implement the proposed concept.

As a third task, the mapping of RCM memory among hosts may be performed. FIG. 11*d* shows a schematic diagram of an example of mapping memory among hosts (with Host-A as requester and Host-B as provider). All of the components shown in FIG. 11*d* may be added to implement the proposed concept. In FIG. 11*d*, Remote Host-B 200 may prepare 1151 the memory (by collecting memory block: physical address and size), deliver 1152 attributes (physical address and size) to Host-A for mapping. Host-A 300 may receive 1130 mapping info from one Host-B and perform the mapping 1140. Host-A may calculate the remote memory size and map 1141 the remote memory block to local memory (RCM, ZONE_RCM_MOVABLE_MEMORY). Host-A may then set 1142 remote Host-B's IP/Local Memory Address, Remote Memory Address/Size into one table (e.g., one group of RCM Memory Translation Table via the ACPI API). Host A may set 1143 the local block's as "ZONE_RCM_MOVABLE_MEMORY==1". Then, the memory can be accessed in read/write mode by Host-A.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

In the following, various examples of the present disclosure are presented:

An example (e.g., example 1) relates to a network interface controller apparatus (20; 30) comprising circuitry configured to Obtain a memory transaction request with respect to memory of a first host (200) hosting the network interface controller apparatus from a second host (300). The circuitry is configured to Translate the memory transaction request to a cache transaction request. The circuitry is configured to es Provide the cache transaction request to the first host. The circuitry is configured to Obtain a response to the cache transaction request from the first host. The circuitry is configured to Provide information on the response to the cache transaction request to the second host.

Another example (e.g., example 2) relates to a previously described example (e.g., example 1) or to any of the examples described herein, further comprising that the network interface controller apparatus is configured to provide remote access to the memory of the first host for the second host.

Another example (e.g., example 3) relates to a previously described example (e.g., one of the examples 1 to 2) or to any of the examples described herein, further comprising that the circuitry is configured to obtain the memory transaction request via a computer network from the second host, and to provide the information on the response to the cache transaction request via the computer network to the second host.

Another example (e.g., example 4) relates to a previously described example (e.g., example 3) or to any of the examples described herein, further comprising that the computer network is an ethernet-based computer network.

Another example (e.g., example 5) relates to a previously described example (e.g., one of the examples 1 to 4) or to any of the examples described herein, further comprising that the circuitry is configured to obtain the memory transaction request as part of a network packet, and to extract the memory transaction request from the network packet to obtain the memory transaction request.

Another example (e.g., example 6) relates to a previously described example (e.g., one of the examples 1 to 5) or to any of the examples described herein, further comprising that the circuitry is configured to encapsulate the information on the response to the cache transaction request in a network packet, and to provide the network packet with the information on the response to the cache transaction request to the second host.

Another example (e.g., example 7) relates to a previously described example (e.g., one of the examples 1 to 6) or to any of the examples described herein, further comprising that the circuitry is configured to provide the response to the cache transaction request to the second host.

Another example (e.g., example 8) relates to a previously described example (e.g., one of the examples 1 to 6) or to any of the examples described herein, further comprising that the circuitry is configured to translate the response to the cache transaction request to a response suitable for the memory transaction request, and to provide the response suitable for the memory transaction request as information on the response to the cache transaction request to the second host.

Another example (e.g., example 9) relates to a previously described example (e.g., one of the examples 1 to 8) or to any of the examples described herein, further comprising that the circuitry is configured to provide the cache transaction request to a device coherency agent.

Another example (e.g., example 10) relates to a previously described example (e.g., one of the examples 1 to 9) or to any of the examples described herein, further comprising that the network interface controller apparatus is configured to provide remote access to the memory of the second host for the first host, wherein the circuitry is configured to obtain a further memory transaction request with respect to memory of the second host from the first host.

The circuitry is configured to provide the further memory transaction request to the second host. The circuitry is configured to obtain information on a response to a further cache transaction request from the second host in response to the further memory transaction request. The circuitry is configured to provide a response suitable for the further memory transaction request to the first host based on the information on the response to the further cache transaction request.

Another example (e.g., example 11) relates to a previously described example (e.g., example 10) or to any of the examples described herein, further comprising that the circuitry is configured to look up a network address of the second host, and to provide the further memory transaction request to the second host based on the network address of the second host.

Another example (e.g., example 12) relates to a previously described example (e.g., example 11) or to any of the examples described herein, further comprising that the circuitry is configured to look up the network address of the second host from a network address data storage of the network interface controller apparatus.

Another example (e.g., example 13) relates to a previously described example (e.g., one of the examples 10 to 12) or to any of the examples described herein, further comprising that the circuitry is configured to provide the further memory transaction request via a computer network to the second host, and to obtain the information on the response to the further cache transaction request via the computer network from the second host.

Another example (e.g., example 14) relates to a previously described example (e.g., one of the examples 10 to 13) or to any of the examples described herein, further comprising that the circuitry is configured to encapsulate the further memory transaction request in a network packet, and to provide the network packet with the further memory transaction request to the second host.

Another example (e.g., example 15) relates to a previously described example (e.g., one of the examples 10 to 14) or to any of the examples described herein, further comprising that the circuitry is configured to obtain the information on the response to the further cache transaction request as part of a network packet, and to extract the information on the response to the further cache transaction request from the network packet to obtain the information on the response to the further cache transaction request.

Another example (e.g., example 16) relates to a previously described example (e.g., one of the examples 10 to 15) or to any of the examples described herein, further comprising that the information on the response to the further cache transaction request comprises the response to the cache transaction request, wherein the circuitry is configured to translate the response to the further cache transaction request to the response suitable for the memory transaction request.

Another example (e.g., example 17) relates to a previously described example (e.g., one of the examples 10 to 16) or to any of the examples described herein, further comprising that the information on the response to the further cache transaction request comprises the response suitable for the memory transaction request.

Another example (e.g., example 18) relates to a previously described example (e.g., one of the examples 10 to 17) or to any of the examples described herein, further comprising that the circuitry is configured to provide the response suitable for the further memory transaction request to a device coherency agent.

Another example (e.g., example 19) relates to a previously described example (e.g., one of the examples 10 to 17) or to any of the examples described herein, further comprising that the network interface controller apparatus is configured to expose the memory of the second host towards the first host as a region of memory of the network interface controller apparatus.

Another example (e.g., example 20) relates to a previously described example (e.g., one of the examples 1 to 19) or to any of the examples described herein, further comprising that the network interface controller apparatus is configured to communicate with the first host via a Compute Express Link.

An example (e.g., example 21) relates to a network interface controller apparatus (20; 30) comprising circuitry configured to obtain a memory transaction request with respect to memory of a second host (200) from a first host (300) hosting the network interface controller apparatus. The circuitry is configured to provide the memory transaction request to the second host. The circuitry is configured to obtain information on a response to a cache transaction request from the second host in response to the memory transaction request. The circuitry is configured to provide a response suitable for the memory transaction request to the first host based on the information on the response to the cache transaction request.

Another example (e.g., example 22) relates to a previously described example (e.g., example 21) or to any of the examples described herein, further comprising that the network interface controller apparatus is configured to provide remote access to the memory of the second host for the first host.

Another example (e.g., example 23) relates to a previously described example (e.g., one of the examples 21 to 22) or to any of the examples described herein, further comprising that the circuitry is configured to look up a network address of the second host, and to provide the further memory transaction request to the second host based on the network address of the second host.

Another example (e.g., example 24) relates to a previously described example (e.g., one of the examples 21 to 23) or to any of the examples described herein, further comprising that the network interface controller apparatus is configured to expose the memory of the second host towards the first host as a region of memory of the network interface controller apparatus.

An example (e.g., example 25) relates to a network interface controller apparatus (20; 30) comprising circuitry configured to provide remote access to the memory of a first host (200) for a second host (300), the first host hosting the network interface controller apparatus, by obtaining an incoming memory transaction request with respect to memory of the first host from the second host, translating the incoming memory transaction request to a cache transaction request, Providing the cache transaction request to the first host, Obtaining a response to the cache transaction request from the first host, and Providing outgoing information on the response to the cache transaction request to the second host. The circuitry is configured to provide remote access to the memory of the second host for the first host by obtaining an outgoing memory transaction request with respect to memory of the second host from the first host, providing the outgoing memory transaction request to the second host, obtaining incoming information on a response to a cache transaction request from the second host in response to the outgoing memory transaction request, and providing a response suitable for the outgoing memory transaction request to the first host based on the incoming information on the response to the cache transaction request.

An example (e.g., example 26) relates to a network interface controller device (20; 30) comprising means for processing configured to Obtain a memory transaction request with respect to memory of a first host (200) hosting the network interface controller device from a second host (300). The means for processing is configured to Translate the memory transaction request to a cache transaction request. The means for processing is configured to Provide the cache transaction request to the first host. The means for processing is configured to Obtain a response to the cache transaction request from the first host. The means for processing is configured to Provide information on the response to the cache transaction request to the second host.

Another example (e.g., example 27) relates to a previously described example (e.g., example 26) or to any of the examples described herein, further comprising that the network interface controller device is configured to provide remote access to the memory of the first host for the second host.

Another example (e.g., example 28) relates to a previously described example (e.g., one of the examples 26 to 27) or to any of the examples described herein, further comprising that the means for processing is configured to obtain the memory transaction request via a computer network from the second host, and to provide the information on the response to the cache transaction request via the computer network to the second host.

Another example (e.g., example 29) relates to a previously described example (e.g., example 28) or to any of the examples described herein, further comprising that the computer network is an ethernet-based computer network.

Another example (e.g., example 30) relates to a previously described example (e.g., one of the examples 26 to 29) or to any of the examples described herein, further comprising that the means for processing is configured to obtain the memory transaction request as part of a network packet, and to extract the memory transaction request from the network packet to obtain the memory transaction request.

Another example (e.g., example 31) relates to a previously described example (e.g., one of the examples 26 to 30) or to any of the examples described herein, further comprising that the means for processing is configured to encapsulate the information on the response to the cache transaction request in a network packet, and to provide the network packet with the information on the response to the cache transaction request to the second host.

Another example (e.g., example 32) relates to a previously described example (e.g., one of the examples 26 to 31) or to any of the examples described herein, further comprising that the means for processing is configured to provide the response to the cache transaction request to the second host.

Another example (e.g., example 33) relates to a previously described example (e.g., one of the examples 26 to 31) or to any of the examples described herein, further comprising that the means for processing is configured to translate the response to the cache transaction request to a response suitable for the memory transaction request, and to provide the response suitable for the memory transaction request as information on the response to the cache transaction request to the second host.

Another example (e.g., example 34) relates to a previously described example (e.g., one of the examples 26 to 33) or to any of the examples described herein, further comprising that the means for processing is configured to provide the cache transaction request to a device coherency agent.

Another example (e.g., example 35) relates to a previously described example (e.g., one of the examples 26 to 34) or to any of the examples described herein, further comprising that the network interface controller device is configured to provide remote access to the memory of the second host for the first host, wherein the means for processing is configured to obtain a further memory transaction request with respect to memory of the second host from the first host. The means for processing is configured to provide the further memory transaction request to the second host. The means for processing is configured to obtain information on a response to a further cache transaction request from the second host in response to the further memory transaction request. The means for processing is configured to provide a response suitable for the further memory transaction request to the first host based on the information on the response to the further cache transaction request.

Another example (e.g., example 36) relates to a previously described example (e.g., example 35) or to any of the examples described herein, further comprising that the means for processing is configured to look up a network address of the second host, and to provide the further memory transaction request to the second host based on the network address of the second host.

Another example (e.g., example 37) relates to a previously described example (e.g., example 36) or to any of the examples described herein, further comprising that the means for processing is configured to look up the network address of the second host from a network address data storage of the network interface controller device.

Another example (e.g., example 38) relates to a previously described example (e.g., one of the examples 35 to 37) or to any of the examples described herein, further comprising that the means for processing is configured to provide the further memory transaction request via a computer network to the second host, and to obtain the information on the response to the further cache transaction request via the computer network from the second host.

Another example (e.g., example 39) relates to a previously described example (e.g., one of the examples 35 to 38) or to any of the examples described herein, further comprising that the means for processing is configured to encapsulate the further memory transaction request in a network packet, and to provide the network packet with the further memory transaction request to the second host.

Another example (e.g., example 40) relates to a previously described example (e.g., one of the examples 35 to 39) or to any of the examples described herein, further comprising that the means for processing is configured to obtain the information on the response to the further cache transaction request as part of a network packet, and to extract the information on the response to the further cache transaction request from the network packet to obtain the information on the response to the further cache transaction request.

Another example (e.g., example 41) relates to a previously described example (e.g., one of the examples 35 to 40) or to any of the examples described herein, further comprising that the information on the response to the further cache transaction request comprises the response to the cache transaction request, wherein the means for processing is configured to translate the response to the further cache transaction request to the response suitable for the memory transaction request Another example (e.g., example 42) relates to a previously described example (e.g., one of the examples 35 to 41) or to any of the examples described herein, further comprising that the information on the response to the further cache transaction request comprises the response suitable for the memory transaction request.

Another example (e.g., example 43) relates to a previously described example (e.g., one of the examples 35 to 42) or to any of the examples described herein, further comprising that the means for processing is configured to provide the response suitable for the further memory transaction request to a device coherency agent.

Another example (e.g., example 44) relates to a previously described example (e.g., one of the examples 35 to 43) or to any of the examples described herein, further comprising that the network interface controller device is configured to expose the memory of the second host towards the first host as a region of memory of the network interface controller device.

Another example (e.g., example 45) relates to a previously described example (e.g., one of the examples 26 to 44) or to any of the examples described herein, further comprising that the network interface controller device is configured to communicate with the first host via a Compute Express Link.

An example (e.g., example 46) relates to a network interface controller device (20; 30) comprising means for processing configured to obtain a memory transaction request with respect to memory of a second host (200) from a first host (300) hosting the network interface controller device. The means for processing is configured to provide the memory transaction request to the second host. The means for processing is configured to obtain information on a response to a cache transaction request from the second host in response to the memory transaction request. The means for processing is configured to provide a response suitable for the memory transaction request to the first host based on the information on the response to the cache transaction request.

Another example (e.g., example 47) relates to a previously described example (e.g., example 46) or to any of the examples described herein, further comprising that the network interface controller device is configured to provide remote access to the memory of the second host for the first host.

Another example (e.g., example 48) relates to a previously described example (e.g., one of the examples 46 to 47) or to any of the examples described herein, further comprising that the means for processing is configured to look up a network address of the second host, and to provide the further memory transaction request to the second host based on the network address of the second host.

Another example (e.g., example 49) relates to a previously described example (e.g., one of the examples 46 to 48) or to any of the examples described herein, further comprising that the network interface controller device is configured to expose the memory of the second host towards the first host as a region of memory of the network interface controller device.

An example (e.g., example 50) relates to a network interface controller device (20 30) comprising means for processing configured to provide remote access to the memory of a first host (200) for a second host (300), the first host hosting the network interface controller device, by obtaining an incoming memory transaction request with respect to memory of the first host from the second host, translating the incoming memory transaction request to a cache transaction request, Providing the cache transaction request to the first host, Obtaining a response to the cache transaction request from the first host, and Providing outgoing information on the response to the cache transaction request to the second host. The means for processing is configured to provide remote access to the memory of the second host for the first host by obtaining an outgoing memory transaction request with respect to memory of the second host from the first host, providing the outgoing memory transaction request to the second host, obtaining incoming information on a response to a cache transaction request from the second host in response to the outgoing memory transaction request, and providing a response suitable for the outgoing memory transaction request to the first host based on the incoming information on the response to the cache transaction request.

An example (e.g., example 51) relates to a method for a network interface controller, the method comprising Obtaining (210) a memory transaction request with respect to memory of a first host (200) hosting the network interface controller from a second host (300). The method comprises Translating (230) the memory transaction request to a cache transaction request. The method comprises Providing (240) the cache transaction request to the first host. The method comprises Obtaining (250) a response to the cache transaction request from the first host. The method comprises Providing (280) information on the response to the cache transaction request to the second host.

Another example (e.g., example 52) relates to a previously described example (e.g., example 51) or to any of the examples described herein, further comprising that the network interface controller is configured to provide remote access to the memory of the first host for the second host.

Another example (e.g., example 53) relates to a previously described example (e.g., one of the examples 51 to 52) or to any of the examples described herein, further comprising that the method comprises obtaining the memory transaction request via a computer network from the second host, and providing the information on the response to the cache transaction request via the computer network to the second host.

Another example (e.g., example 54) relates to a previously described example (e.g., one of the examples 51 to 53) or to any of the examples described herein, further comprising that the method comprises obtaining the memory transaction request as part of a network packet, and extracting (220) the memory transaction request from the network packet to obtain the memory transaction request.

Another example (e.g., example 55) relates to a previously described example (e.g., one of the examples 51 to 54) or to any of the examples described herein, further comprising that the method comprises encapsulating (270) the information on the response to the cache transaction request in a network packet, and providing the network packet with the information on the response to the cache transaction request to the second host.

Another example (e.g., example 56) relates to a previously described example (e.g., one of the examples 51 to 55) or to any of the examples described herein, further comprising that the method comprises providing the response to the cache transaction request to the second host.

Another example (e.g., example 57) relates to a previously described example (e.g., one of the examples 51 to 55) or to any of the examples described herein, further comprising that the method comprises translating (260) the response to the cache transaction request to a response suitable for the memory transaction request, and providing the response suitable for the memory transaction request as information on the response to the cache transaction request to the second host.

Another example (e.g., example 58) relates to a previously described example (e.g., one of the examples 51 to 57) or to any of the examples described herein, further comprising that the method comprises providing the cache transaction request to a device coherency agent.

Another example (e.g., example 59) relates to a previously described example (e.g., one of the examples 51 to 58) or to any of the examples described herein, further comprising that the network interface controller is configured to provide remote access to memory of the second host for the first host, wherein the method comprises obtaining (320) a further memory transaction request with respect to memory of the second host from the first host. The method comprises providing (350) the further memory transaction request to the second host. The method comprises obtaining (360) information on a response to a further cache transaction request from the second host in response to the further memory transaction request. The method comprises providing (390) a response suitable for the further memory transaction request to the first host based on the information on the response to the further cache transaction request.

Another example (e.g., example 60) relates to a previously described example (e.g., example 59) or to any of the examples described herein, further comprising that the method comprises looking up (330) a network address of the second host, and providing the further memory transaction request to the second host based on the network address of the second host.

Another example (e.g., example 61) relates to a previously described example (e.g., example 60) or to any of the examples described herein, further comprising that the method comprises looking up (330) the network address of the second host from a network address data storage of the method for the network interface controller.

Another example (e.g., example 62) relates to a previously described example (e.g., one of the examples 59 to 61) or to any of the examples described herein, further comprising that the method comprises providing the further memory transaction request via a computer network to the second host, and to obtain the information on the response to the further cache transaction request via the computer network from the second host.

Another example (e.g., example 63) relates to a previously described example (e.g., one of the examples 59 to 62) or to any of the examples described herein, further comprising that the method comprises encapsulating (340) the further memory transaction request in a network packet, and providing the network packet with the further memory transaction request to the second host.

Another example (e.g., example 64) relates to a previously described example (e.g., one of the examples 59 to 63) or to any of the examples described herein, further comprising that the method comprises obtaining the information on the response to the further cache transaction request as part of a network packet, and extracting (370) the information on the response to the further cache transaction request from the network packet to obtain the information on the response to the further cache transaction request.

Another example (e.g., example 65) relates to a previously described example (e.g., one of the examples 59 to 64) or to any of the examples described herein, further comprising that the information on the response to the further cache transaction request comprises the response to the cache transaction request, wherein the method comprises translating (380) the response to the further cache transaction request to the response suitable for the memory transaction request.

Another example (e.g., example 66) relates to a previously described example (e.g., one of the examples 59 to 65) or to any of the examples described herein, further comprising that the method comprises providing the response suitable for the further memory transaction request to a device coherency agent.

Another example (e.g., example 67) relates to a previously described example (e.g., one of the examples 59 to 66) or to any of the examples described herein, further comprising that the method comprises exposing (310) the memory of the second host towards the first host as a region of memory of the method for the network interface controller.

An example (e.g., example 68) relates to a method for a network interface controller, the method comprising obtaining (320) a memory transaction request with respect to memory of a second host (300) from a first host (200) hosting the network interface controller. The method comprises providing (350) the memory transaction request to the second host. The method comprises obtaining (360) information on a response to a cache transaction request from the second host in response to the memory transaction request. The method comprises providing (390) a response suitable for the memory transaction request to the first host based on the information on the response to the cache transaction request.

Another example (e.g., example 69) relates to a previously described example (e.g., example 68) or to any of the examples described herein, further comprising that the network interface controller is configured to provide remote access to the memory of the second host for the first host.

Another example (e.g., example 70) relates to a previously described example (e.g., one of the examples 68 to 69) or to any of the examples described herein, further comprising that the method comprises looking up (330) a network address of the second host, and providing the further memory transaction request to the second host based on the network address of the second host.

Another example (e.g., example 71) relates to a previously described example (e.g., one of the examples 58 to 70) or to any of the examples described herein, further comprising that the method comprises exposing (310) the memory of the second host towards the first host as a region of memory of the network interface controller.

An example (e.g., example 72) relates to an apparatus (1000) for initializing a network interface controller apparatus (20; 30) in a first host (200), the network interface controller apparatus being configured to provide remote access to the memory of one or more second hosts (300) for the first host, the apparatus comprising circuitry configured to obtain information on the network interface controller apparatus being configured to provide remote access to the memory of the one or more second hosts from the network interface controller apparatus. The circuitry is configured to include the network interface controller apparatus as hot-pluggable memory device in a system description data structure being exposed to an operating system of the first host.

Another example (e.g., example 73) relates to a previously described example (e.g., example 72) or to any of the examples described herein, further comprising that the network interface controller apparatus is included as hot-pluggable memory device in a table specified by the advanced configuration and power interface specification.

Another example (e.g., example 74) relates to a previously described example (e.g., example 73) or to any of the examples described herein, further comprising that the network interface controller apparatus is included in a heterogeneous memory attributes table and/or a memory affinity table specified by the advanced configuration and power interface specification.

Another example (e.g., example 75) relates to a previously described example (e.g., one of the examples 72 to 74) or to any of the examples described herein, further comprising that the apparatus is implemented by a basic input/output system of the first host.

An example (e.g., example 76) relates to a device (1000) for initializing a network interface controller device (20; 30) in a first host (200), the network interface controller device being configured to provide remote access to the memory of one or more second hosts (300) for the first host, the device comprising means for processing configured to obtain information on the network interface controller device being configured to provide remote access to the memory of the one or more second hosts from the network interface controller device. The means for processing is configured to include the network interface controller device as hot-pluggable memory device in a system description data structure being exposed to an operating system of the first host.

Another example (e.g., example 77) relates to a previously described example (e.g., example 76) or to any of the examples described herein, further comprising that the network interface controller device is included as hot-pluggable memory device in a table specified by the advanced configuration and power interface specification.

Another example (e.g., example 78) relates to a previously described example (e.g., example 77) or to any of the examples described herein, further comprising that the network interface controller device is included in a heterogeneous memory attributes table and/or a memory affinity table specified by the advanced configuration and power interface specification.

Another example (e.g., example 79) relates to a previously described example (e.g., one of the examples 76 to 78) or to any of the examples described herein, further comprising that the device is implemented by a basic input/output system of the first host.

An example (e.g., example 80) relates to a method for initializing a network interface controller in a first host, the network interface controller being configured to provide remote access to the memory of one or more second hosts for the first host, the method comprising Obtaining (1011) information on the network interface controller being configured to provide remote access to the memory of the one or more second hosts from the network interface controller. The method comprises Including (1012) the network interface controller as hot-pluggable memory in a system description data structure being exposed to an operating system of the first host.

Another example (e.g., example 81) relates to a previously described example (e.g., example 80) or to any of the examples described herein, further comprising that the network interface controller is included as hot-pluggable memory in a table specified by the advanced configuration and power interface specification.

Another example (e.g., example 82) relates to a previously described example (e.g., example 81) or to any of the examples described herein, further comprising that the network interface controller is included in a heterogeneous memory attributes table and/or a memory affinity table specified by the advanced configuration and power interface specification.

Another example (e.g., example 83) relates to a previously described example (e.g., one of the examples 80 to 82) or to any of the examples described herein, further comprising that the method is performed by a basic input/output system of the first host.

An example (e.g., example 84) relates to a method for initializing a network interface controller apparatus (20; 30) in an operating system of a first host (200), the network interface controller apparatus being configured to provide remote access to the memory of one or more second hosts (300) for the first host, the method comprising Obtaining (1111) information on the network interface controller apparatus from a system description data structure being exposed to the operating system of the first host. The method comprises Setting (1112) a physical memory range for the network interface controller apparatus.

Another example (e.g., example 85) relates to a previously described example (e.g., example 84) or to any of the examples described herein, the method further comprising obtaining (1113) information on the remote memory shared by the one or more second hosts and mapping (1114) the remote memory to local memory in the physical memory range of the network interface controller apparatus.

Another example (e.g., example 86) relates to a previously described example (e.g., example 85) or to any of the examples described herein, further comprising that the information on the remote memory comprises a network address of the one or more second hosts, the method comprising including (1115) the network address and information on the correspondence between local memory and remote memory in a network address data storage of the network interface controller apparatus.

Another example (e.g., example 87) relates to a previously described example (e.g., one of the examples 84 to 86) or to any of the examples described herein, wherein the method further comprises obtaining (1011), by a basic input/output system of the first host, information on the network interface controller apparatus being configured to provide remote access to the memory of the one or more second hosts from the network interface controller apparatus, and including (1012), by the basic input/output system, the network interface controller apparatus as hot-pluggable memory device in a system description data structure being exposed to the operating system of the first host.

An example (e.g., example 88) relates to an apparatus (110) for initializing a network interface controller apparatus (20; 30) in an operating system of a first host (200), the network interface controller apparatus being configured to provide remote access to the memory of one or more second hosts (300) for the first host, the apparatus comprising circuitry configured to perform the method according to one of the examples 84 to 87.

An example (e.g., example 89) relates to a device (110) for initializing a network interface controller apparatus in an operating system of a first host, the network interface controller apparatus being configured to provide remote access to the memory of one or more second hosts for the first host, the apparatus comprising means for processing configured to perform the method according to one of the examples 84 to 87.

An example (e.g., example 90) relates to a machine-readable storage medium including program code, when executed, to cause a machine to perform the method of one of the examples 51 to 67, the method according to one of the examples 68 to 71, the method according to one of the examples 80 to 83 and/or the method according to one of the examples 84 to 87.

An example (e.g., example 91) relates to a computer program having a program code for performing the method of one of the examples 51 to 67, the method according to one of the examples 68 to 71, the method according to one of the examples 80 to 83 and/or the method according to one of the examples 84 to 87, when the computer program is executed on a computer, a processor, or a programmable hardware component.

An example (e.g., example 92) relates to a machine-readable storage including machine readable instructions, when executed, to implement a method or realize an apparatus as claimed in any pending claim or shown in any example.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory) optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion) thereof may be performed by hardware components comprising non-programmable circuitry. In some embodiments, any of the methods herein can be performed by a combination of non-programmable hardware components and one or more processing units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

The disclosed methods, apparatuses, and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The invention claimed is:

1. A network interface controller apparatus comprising interface circuitry and processing circuitry, wherein the network interface controller apparatus is configured to communicate with another host via a Compute Express Link (CXL), wherein the processing circuitry includes a snoop agent and is to:

- obtain a CXL.mem memory transaction request with respect to memory of a first host hosting the network interface controller apparatus from a second host;
- have the snoop agent translate the CXL.mem memory transaction request to a CXL.cache transaction request, wherein the CXL.cache transaction request enables the first host to manage cache coherency for the memory of the first host in a host-bias mode;
- provide the CXL.cache transaction request to the first host;
- obtain a response to the CXL.cache transaction request from the first host; and
- provide information on the response to the CXL.cache transaction request to the second host.

2. The network interface controller apparatus according to claim 1, wherein the network interface controller apparatus is to provide remote access to the memory of the first host for the second host.

3. The network interface controller apparatus according to claim 1, wherein the processing circuitry is to obtain the CXL.mem memory transaction request via a computer network from the second host, and to provide the information on the response to the CXL.cache transaction request via the computer network to the second host.

4. The network interface controller apparatus according to claim 3, wherein the computer network is an ethernet-based computer network.

5. The network interface controller apparatus according to claim 1, wherein the processing circuitry is to provide the response to the CXL.cache transaction request to the second host.

6. The network interface controller apparatus according to claim 1, wherein the processing circuitry is to translate the response to the CXL.cache transaction request to a response suitable for the CXL.mem memory transaction request, and to provide the response suitable for the CXL.mem memory transaction request as information on the response to the CXL.cache transaction request to the second host.

7. The network interface controller apparatus according to claim 1, wherein the processing circuitry is to provide the CXL.cache transaction request to a device coherency agent.

8. The network interface controller apparatus according to claim 1, wherein the network interface controller apparatus is configured to provide remote access to the memory of the second host for the first host, wherein the processing circuitry is to:

- obtain a further CXL.mem memory transaction request with respect to memory of the second host from the first host;
- provide the further CXL.mem memory transaction request to the second host;
- obtain information on a response to a further CXL.cache transaction request from the second host in response to the further CXL.mem memory transaction request; and
- provide a response suitable for the further CXL.mem memory transaction request to the first host based on the information on the response to the further CXL.cache transaction request.

9. The network interface controller apparatus according to claim 8, wherein the processing circuitry is to look up a network address of the second host, and to provide the further CXL.mem memory transaction request to the second host based on the network address of the second host.

10. The network interface controller apparatus according to claim 9, wherein the processing circuitry is to look up the network address of the second host from a network address data storage of the network interface controller apparatus.

11. The network interface controller apparatus according to claim 8, wherein the processing circuitry is to provide the further CXL.mem memory transaction request via a computer network to the second host, and to obtain the information on the response to the further CXL.cache transaction request via the computer network from the second host.

12. The network interface controller apparatus according to claim 8, wherein the information on the response to the further CXL.cache transaction request comprises the response to the CXL.cache transaction request, wherein the processing circuitry is to translate the response to the further CXL.cache transaction request to the response suitable for the CXL.mem memory transaction request.

13. The network interface controller apparatus according to claim 8, wherein the information on the response to the further CXL.cache transaction request comprises the response suitable for the CXL.mem memory transaction request.

14. The network interface controller apparatus according to claim 8, wherein the network interface controller apparatus is configured to expose the memory of the second host towards the first host as a region of memory of the network interface controller apparatus.

15. A network interface controller apparatus comprising interface circuitry and processing circuitry, wherein the network interface controller apparatus is configured to communicate with another host via a Compute Express Link (CXL), wherein the processing circuitry includes a memory router and a memory translation table, and is to:

- obtain a CXL.mem memory transaction request with respect to memory of a second host from a first host hosting the network interface controller apparatus;
- have the memory router look up a network address of the second host in the memory translation table based on the CXL.mem memory transaction request and provide the CXL.mem memory transaction request to the second host based on the network address;
- obtain information on a response to a CXL.cache transaction request from the second host in response to the CXL.mem memory transaction request; and
- have the memory router translate the information on the response to the CXL.cache transaction request into a response suitable for the CXL.mem memory transaction request and provide the response to the first host.

16. The network interface controller apparatus according to claim 15, wherein the network interface controller apparatus is to provide remote access to the memory of the second host for the first host.

17. A method for a network interface controller, wherein the network interface controller apparatus is configured to communicate with another host via a Compute Express Link (CXL), the method comprising:

obtaining a CXL.mem memory transaction request with respect to memory of a first host hosting the network interface controller from a second host;

translating, by a snoop agent in the network interface controller, the CXL.mem memory transaction request to a CXL.cache transaction request, wherein the CXL.cache transaction request enables the first host to manage cache coherency for the memory of the first host in a host-bias mode;

providing the CXL.cache transaction request to the first host;

obtaining a response to the CXL.cache transaction request from the first host; and providing information on the response to the CXL.cache transaction request to the second host.

18. The method for the network interface controller according to claim 17, wherein the network interface controller is configured to provide remote access to memory of the second host for the first host, wherein the method comprises:

obtaining a further CXL.mem memory transaction request with respect to memory of the second host from the first host;

providing the further CXL.mem memory transaction request to the second host;

obtaining information on a response to a further CXL.cache transaction request from the second host in response to the further CXL.mem memory transaction request; and providing a response suitable for the further CXL.mem memory transaction request to the first host based on the information on the response to the further CXL.cache transaction request.

19. A non-transitory machine-readable storage medium including program code, when executed, to cause a machine to perform the method of claim 17.

* * * * *